(12) United States Patent
Dickinson et al.

(10) Patent No.: US 7,909,895 B2
(45) Date of Patent: Mar. 22, 2011

(54) SLURRY DEWATERING AND CONVERSION OF BIOSOLIDS TO A RENEWABLE FUEL

(75) Inventors: Norman L. Dickinson, Monte Sereno, CA (US); Kevin M. Bolin, Atlanta, GA (US); Edward Overstreet, Atlanta, GA (US); Brian Dooley, Atlanta, GA (US)

(73) Assignee: EnerTech Environmental, Inc., Atlanta, GA (US)

(*) Notice: Subject to any disclaimer, the term of this patent is extended or adjusted under 35 U.S.C. 154(b) by 680 days.

(21) Appl. No.: 11/269,499

(22) Filed: Nov. 7, 2005

(65) Prior Publication Data
US 2006/0096163 A1 May 11, 2006

Related U.S. Application Data

(60) Provisional application No. 60/626,680, filed on Nov. 10, 2004.

(51) Int. Cl.
*C10L 5/42* (2006.01)
(52) U.S. Cl. ........... 44/307; 44/605; 210/605; 210/630; 210/761
(58) Field of Classification Search ............... 44/605; 210/605, 630, 761, 768–772
See application file for complete search history.

(56) References Cited

U.S. PATENT DOCUMENTS

| | | | |
|---|---|---|---|
| 3,580,193 A | 5/1971 | Logan et al. | |
| 3,729,042 A | 4/1973 | Burnett | |
| 3,830,636 A | 8/1974 | Marsh | |
| 3,853,759 A | 12/1974 | Titmas | |
| 4,017,421 A | 4/1977 | Othmer | |
| 4,038,152 A | 7/1977 | Arkins | |
| 4,087,276 A | 5/1978 | Generini | |
| 4,126,519 A | 11/1978 | Murray | |
| 4,128,946 A | 12/1978 | Maffet | |
| 4,192,653 A | 3/1980 | Giannetti et al. | |
| 4,208,245 A | 6/1980 | Watkins et al. | |

(Continued)

FOREIGN PATENT DOCUMENTS

EP 0 328 574 1/1992

(Continued)

OTHER PUBLICATIONS

McCabe, W.L. (1993). Unit Operations of Chemical Engineering, 5th ed. McGraw-Hill, pp. 189-191.*

(Continued)

*Primary Examiner* — Robert J Hill, Jr.
*Assistant Examiner* — Brian McCaig
(74) *Attorney, Agent, or Firm* — Baker & Daniels LLP

(57) ABSTRACT

In the processes for treating municipal sewage and storm water containing biosolids to discharge standards, biosolids, even after dewatering, contain typically about 80% water bound in the dead cells of the biosolids, which gives biosolids a negative heating value. It can be incinerated only at the expense of purchased fuel.

Biosolids are heated to a temperature at which their cell structure is destroyed and, preferably, at which carbon dioxide is split off to lower the oxygen content of the biosolids. The resulting char is not hydrophilic, and it can be efficiently dewatered and/or dried and is a viable renewable fuel. This renewable fuel can be supplemented by also charging conventional biomass (yard and crop waste, etc.) in the same or in parallel facilities. Similarly, non-renewable hydrophilic fuels can be so processed in conjunction with the processing of biosolids to further augment the energy supply.

104 Claims, 6 Drawing Sheets

U.S. PATENT DOCUMENTS

| | | | |
|---|---|---|---|
| 4,229,296 A | 10/1980 | Wheaton et al. | |
| 4,241,722 A | 12/1980 | Dickinson | |
| 4,255,129 A | 3/1981 | Reed et al. | |
| 4,272,322 A | 6/1981 | Kobayashi | |
| 4,284,015 A | 8/1981 | Dickinson | |
| 4,292,953 A | 10/1981 | Dickinson | |
| 4,377,066 A | 3/1983 | Dickinson | |
| 4,380,960 A | 4/1983 | Dickinson | |
| 4,414,813 A | 11/1983 | Knapp | |
| 4,477,257 A | 10/1984 | Koppelman et al. | |
| 4,486,959 A | 12/1984 | Chang | |
| 4,579,562 A | 4/1986 | Tarman et al. | |
| 4,593,202 A | 6/1986 | Dickinson | |
| 4,615,711 A | 10/1986 | Muller | |
| 4,618,735 A | 10/1986 | Bridle et al. | |
| 4,657,681 A | 4/1987 | Hughes et al. | |
| 4,702,745 A | 10/1987 | Kamei et al. | |
| 4,714,032 A | 12/1987 | Dickinson | |
| 4,721,575 A | 1/1988 | Binning et al. | |
| 4,735,729 A | 4/1988 | Dietrich et al. | |
| 4,761,893 A | 8/1988 | Glorioso | |
| 4,762,527 A | 8/1988 | Beshore et al. | |
| 4,765,911 A * | 8/1988 | Rasmussen | 210/710 |
| 4,795,568 A | 1/1989 | Chen | |
| 4,824,561 A | 4/1989 | Huang et al. | |
| 4,829,678 A | 5/1989 | Glorioso | |
| 4,852,269 A | 8/1989 | Glorioso | |
| 4,860,671 A | 8/1989 | Glorioso | |
| 4,869,833 A | 9/1989 | Binning et al. | |
| 4,875,905 A | 10/1989 | Somerville et al. | |
| 4,898,107 A | 2/1990 | Dickinson | |
| 4,909,899 A | 3/1990 | Kiiskila | |
| 4,915,706 A | 4/1990 | Daley et al. | |
| 4,922,841 A | 5/1990 | Kent | |
| 4,953,478 A | 9/1990 | Glorioso | |
| 4,956,926 A | 9/1990 | Glorioso | |
| 4,983,296 A | 1/1991 | McMahon et al. | |
| 4,983,782 A | 1/1991 | Merz et al. | |
| 4,989,344 A | 2/1991 | Glorioso | |
| 5,000,099 A | 3/1991 | Dickinson | |
| 5,009,767 A * | 4/1991 | Bartilucci et al. | 208/85 |
| 5,018,456 A | 5/1991 | Williams | |
| 5,019,135 A | 5/1991 | Sealock, Jr. et al. | |
| 5,050,375 A | 9/1991 | Dickinson | |
| 5,057,231 A | 10/1991 | Mueller et al. | |
| 5,075,015 A | 12/1991 | Kamke | |
| 5,082,571 A | 1/1992 | Beula et al. | |
| 5,087,370 A | 2/1992 | Schultheis et al. | |
| 5,087,378 A | 2/1992 | Kovacs | |
| 5,114,541 A | 5/1992 | Bayer | |
| 5,132,007 A | 7/1992 | Meyer et al. | |
| 5,183,577 A | 2/1993 | Lehmann | |
| 5,188,739 A | 2/1993 | Khan et al. | |
| 5,188,740 A | 2/1993 | Khan | |
| 5,188,741 A | 2/1993 | Zang et al. | |
| 5,205,906 A | 4/1993 | Grutsch et al. | |
| 5,211,723 A | 5/1993 | Khan | |
| 5,211,724 A | 5/1993 | Khan et al. | |
| 5,217,625 A | 6/1993 | Khan et al. | |
| 5,221,480 A | 6/1993 | Schultheis et al. | |
| 5,230,211 A | 7/1993 | McMahon et al. | |
| 5,230,810 A | 7/1993 | Clark et al. | |
| 5,234,468 A | 8/1993 | Khan | |
| 5,234,469 A | 8/1993 | Khan et al. | |
| 5,234,607 A | 8/1993 | Brandenburg et al. | |
| 5,240,619 A | 8/1993 | Copa et al. | |
| 5,261,225 A | 11/1993 | Dickinson | |
| 5,264,009 A | 11/1993 | Khan | |
| 5,266,085 A | 11/1993 | McMahon et al. | |
| 5,273,556 A | 12/1993 | McMahon et al. | |
| 5,280,701 A | 1/1994 | Tolman | |
| 5,288,413 A | 2/1994 | Chu | |
| 5,292,429 A | 3/1994 | DesOrmeaux | |
| 5,292,442 A | 3/1994 | Khan et al. | |
| 5,337,496 A | 8/1994 | Glorioso | |
| 5,339,621 A | 8/1994 | Tolman | |
| 5,349,910 A | 9/1994 | Hundebol | |
| 5,356,540 A | 10/1994 | Khan et al. | |
| 5,370,715 A | 12/1994 | Kortzeborn et al. | |
| 5,389,259 A | 2/1995 | Berrigan, Jr. | |
| 5,389,264 A | 2/1995 | Lehmann et al. | |
| 5,485,728 A | 1/1996 | Dickinson | |
| 5,500,044 A | 3/1996 | Meade et al. | |
| 5,582,793 A | 12/1996 | Glazer et al. | |
| 5,586,510 A | 12/1996 | Leonard et al. | |
| 5,630,854 A | 5/1997 | Sealock, Jr. et al. | |
| 5,641,413 A | 6/1997 | Momont et al. | |
| 5,685,153 A | 11/1997 | Dickinson et al. | |
| 5,707,417 A | 1/1998 | Yokoyama et al. | |
| 5,711,768 A | 1/1998 | Schulz | |
| 5,724,805 A * | 3/1998 | Golomb et al. | 60/783 |
| 5,797,972 A | 8/1998 | Schulz | |
| 5,816,795 A | 10/1998 | Hansen et al. | |
| 5,888,256 A | 3/1999 | Morrison | |
| 5,888,307 A | 3/1999 | Solheim | |
| 5,888,453 A | 3/1999 | Luker | |
| 5,975,439 A | 11/1999 | Chieffalo et al. | |
| 6,022,514 A * | 2/2000 | Nakahara et al. | 423/322 |
| 6,029,588 A | 2/2000 | Baudhuin | |
| 6,036,862 A * | 3/2000 | Stover | 210/603 |
| 6,063,147 A | 5/2000 | Winter et al. | |
| 6,096,283 A | 8/2000 | Cooper et al. | |
| 6,103,191 A | 8/2000 | Luker | |
| 6,143,176 A * | 11/2000 | Nagamatsu et al. | 210/603 |
| 6,146,133 A | 11/2000 | Erhard et al. | |
| 6,149,694 A | 11/2000 | Redden, Jr. et al. | |
| 6,176,187 B1 | 1/2001 | Leonard et al. | |
| 6,197,081 B1 | 3/2001 | Schmidt | |
| 6,256,902 B1 | 7/2001 | Flaherty et al. | |
| 6,365,047 B1 | 4/2002 | Bischof et al. | |
| 6,436,157 B1 | 8/2002 | Winter et al. | |
| 6,470,812 B1 | 10/2002 | Arroyave-Garcia et al. | |
| 6,692,544 B1 | 2/2004 | Grillenzoni | |
| 6,740,205 B2 | 5/2004 | Molintas | |
| 6,875,015 B1 | 4/2005 | Tiernan | |
| 6,905,600 B2 | 6/2005 | Lee, Jr. | |
| 6,913,700 B2 | 7/2005 | Solheim | |
| 6,962,561 B2 | 11/2005 | Bruno et al. | |
| 6,966,989 B2 | 11/2005 | Hojsgaard et al. | |
| 6,973,968 B2 * | 12/2005 | Pfefferle | 166/260 |
| 6,978,725 B2 | 12/2005 | Ramharter et al. | |
| 7,101,482 B2 | 9/2006 | Chauzy et al. | |
| 7,160,442 B2 | 1/2007 | Horng et al. | |
| 7,179,379 B2 | 2/2007 | Appel et al. | |
| 7,189,074 B2 | 3/2007 | Leung et al. | |
| 7,211,229 B2 | 5/2007 | Halli et al. | |
| 7,252,691 B2 | 8/2007 | Philipson | |
| 7,262,331 B2 | 8/2007 | van de Beld et al. | |
| 7,301,060 B2 | 11/2007 | Appel et al. | |
| 7,311,834 B2 | 12/2007 | Lee, Jr. | |
| 7,434,332 B2 | 10/2008 | Morton et al. | |
| 2004/0025715 A1 | 2/2004 | Bonde et al. | |
| 2004/0172878 A1 | 9/2004 | Krylowicz et al. | |
| 2004/0192980 A1 | 9/2004 | Appel et al. | |
| 2004/0192981 A1 | 9/2004 | Appel et al. | |
| 2005/0108928 A1 | 5/2005 | Sparks et al. | |
| 2005/0113611 A1 | 5/2005 | Adams et al. | |
| 2005/0145569 A1 | 7/2005 | Ulmert | |
| 2005/0274066 A1 | 12/2005 | Morton et al. | |
| 2005/0274068 A1 | 12/2005 | Morton et al. | |
| 2005/0274293 A1 | 12/2005 | Morton et al. | |
| 2006/0060526 A1 | 3/2006 | Binning et al. | |
| 2007/0043246 A1 | 2/2007 | Bridle | |
| 2007/0098625 A1 | 5/2007 | Adams et al. | |
| 2007/0289205 A1 | 12/2007 | Sparks | |
| 2008/0072478 A1 | 3/2008 | Cooper | |

FOREIGN PATENT DOCUMENTS

| | | |
|---|---|---|
| EP | 0515117 A1 | 11/1992 |
| EP | 0 377 832 | 10/1993 |
| EP | 1 717 209 | 11/2006 |
| EP | 1 894 893 | 3/2008 |
| EP | 1894893 A1 | 3/2008 |
| JP | 11171628 * | 6/1999 |
| WO | 02/36506 | 5/2002 |
| WO | 02/081379 | 10/2002 |
| WO | 2005/121033 | 12/2005 |

| WO | 2006032282 | 3/2006 |
| WO | 2006053020 | 5/2006 |
| WO | 2009031796 A2 | 3/2009 |

OTHER PUBLICATIONS

Forster, C.F. (1981). Biotechnology Letters, 3(12), 707-712.*

Neyens, E. et al., "A review of thermal sludge pre-treatment processes to improve dewaterability", Journal of Hazardous Materials, 2003, pp. 51-67.

Weemaes, Marjoleine P.J., et al., "Evaluation of Current Wet Sludge Disintegration Techniques", Centre for Environmental Sanitation, University Ghent, Ghent, Belgium, Jun. 12, 1998.

Walley, Paul, "Optimising Thermal Hydrolysis for Reliable High Digester Solids Loading and Performance", 12th European Biosolids and Organic Resources Conference, 2007.

CH2MHill and Itron, Task 2.2.1 Final Report prepared for the California Energy Commission, "Commonwealth Energy Biogas/PV Mini-Grid Renewal Resources Program, Making Renewables Part of an Affordable and Diverse Electric System in California, Contract No. 500-00-036, Process Selection Report for Wastewater Treatment Plants, Project No. 2.2 Enhanced Energy Recovery Through Optimization of Anaerobic Digestion and Microturbines", Aug. 2003.

Kelly, Harlan G., "Emergy Processes in Biosolids Treatment, 2005", Journal of Environmental Engineering and Science, May 2006.

Presentation - EnerTech Environmental, Inc., Introduction of the Rialto Regional Biosolids Project, Oct. 23, 2003 (10 pages)

Partial International Search Report for International Application No. PCT/US2010/030197, Jun. 30, 2010 (6 pages).

International Search Report and Written Opinion dated Sep. 6, 2010 in International Application No. PCT/US2010/030197.

* cited by examiner

SLURRY DEWATERING AND CONVERSION OF BIOSOLIDS TO A RENEWABLE FUEL

FIELD OF THE INVENTION

Sludge from sewage and wastewater treatment plants, and the biosolids it contains, represents a serious disposal problem. The Water Environment Federation (WEF) formally recognized the term "biosolids" in 1991, and it is now in common use throughout the world. The WEF defines "biosolids" as the soil-like residue of materials removed from sewage during the wastewater treatment process. During treatment, bacteria and other tiny organisms break sewage down into simpler and more stable forms of organic matter. The organic matter, combined with bacterial cell masses, settles out to form biosolids. According to USEPA, biosolids that meet treatment and pollutant content criteria "can be safely recycled and applied as fertilizer to sustainably improve and maintain productive soils and stimulate plant growth".

The sludge is a mixture of biosolids (comprised primarily of dead organic cells which are a by-product of treating sewage and wastewater so that it can be released into open waters) and varying amounts of free water. Free water can be at least partially removed by mechanical dewatering methods. In addition to the free water, the biosolids contain cell-bound water, which can make up as much as 80% of the volume of biosolids and is impossible to remove by mechanical dewatering methods. The large amounts of water contained in such sludge give it a highly negative heat value which makes the cost of incinerating it prohibitive because large amounts of costly fuel would be required to drive off the cell-bound water. In view thereof, such sludge is presently used as landfill or as a fertilizer that can be spread over land, because sewage sludge frequently contains nitrogen and phosphor, for example. However, the sludge also contains harmful substances, generates undesirable odors, and can lead to serious contamination of the soil or the landfill from, amongst others, heavy metals.

In the processes for treating municipal sewage and storm water to discharge standards, solid constituents are concentrated into a by-product, often referred to as sewage sludge. Sewage sludge is a mass or agglomeration of dead organic cells and other solids, called biosolids, which are mixed with varying amounts of water of correspondingly varying viscosity. Irrespective of the degree to which the mass of biosolids is mechanically dewatered, the remaining mass of biosolids typically contains about 80% water, because much of the water is bound inside the dead cells, giving the biosolids mass a negative heating value, thereby making biosolids effectively useless for purposes of extracting heat value from them. Thus, biosolids still are disposed of in landfills or by spreading them on agricultural land as a fertilizer that supplies nitrogen and phosphorus. However, biosolids also may contain live viruses and pathogens and toxic heavy metals, inspiring heated opposition from environmental interests, while their high water content drastically increases the cost of transporting them to a point of use.

According to the present invention, the raw biosolids are heated following their discharge from the sewage treatment plant to rupture the cells, thereby releasing the large quantities of cell-bound water. The temperature is sufficiently high so that the cell structure is destroyed and carbon dioxide is split off to lower the oxygen content of the biosolids. This results in the formation of char that is not hydrophilic and can be efficiently dewatered and/or dried. This char is a viable renewable fuel.

In a further development of the present invention, it is possible to increase the availability of renewable fuels by converting biomass (such as untreated yard and crop waste, etc.) in the same or parallel facilities. Similarly, non-renewable hydrophilic fuels can be so processed to further augment the energy that can be extracted from biosolids in accordance with the invention.

BACKGROUND OF THE INVENTION

There is a growing wave of public support for renewable energy popularly called "Green Power". Several well-known companies, according to Power magazine for May 2003, including General Motors, IBM, Dow Chemical and Johnson & Johnson, have announced plans to purchase a portion of their power requirement from "green" sources. Some companies have even announced intentions to replace all of the electricity used in their manufacturing with "green power". Pillars of fossil energy supply, such as Chevron, British Petroleum (BP) and Shell Oil, have announced their intentions to support environmental causes. In fact, BP is an important supplier of solar energy panels. There is a "Green Power Market Development Group" of the World Resources Institute (WRI), aiming to develop 1,000 Megawatts (MW) of new, cost-competitive "green power" by 2010.

In addition, more than a dozen state legislatures require power marketers to phase in specific and increasing percentages of power from renewable sources. New York has mandated that state agencies must buy 25% of their power from renewable sources by 2013; currently 19.3% of the energy produced in New York is generated from renewable sources (New York Public Service Commission). California has passed legislation requiring that 20% of utilities' electricity in the state be produced from renewable sources by 2017. In fact, one California utility, Pacific Gas and Electricity (PG&E), advertises that more than 30% of its electricity now comes from renewable sources. At least 36 U.S. power retailers now offer a "green power" alternative. Europe also takes renewable energy seriously, targeting 20% of its generation from renewables by 2020.

Conventional renewable energy generally covers origination from solar, wind, hydro-electric, geothermal, biomass and landfill gas. There is some question as to how the demand for renewable energy will be met. Solar and wind are growing, but from a very small base. Hydro-electric and geothermal have limited new sites and face ecological opposition. Landfill gas is limited and also criticized for air pollution. There are currently no other renewable sources which might be tapped to fill the large gap between supply and demand.

Biomass has long been used as a renewable energy source. For example, wood and forestry, as well as agricultural, by-products have been used as fuels for centuries by mechanically firing them in furnaces and boilers with high excess air and low efficiency. The National Renewable Energy Laboratory (NREL) defines biomass as: "organic matter available on a renewable basis. Biomass includes forest and mill residues, agricultural crops and wastes, wood and wood wastes, animal wastes, livestock operation residues, aquatic plants, fast growing trees and plants and municipal and industrial wastes." According to The Sandia National Laboratory's Combustion Research Facility (CRF), combustion is involved in 85% of the world's energy use. If biomass is to make a meaningful contribution to renewable energy, it will be, directly or indirectly, as a fuel.

Sewage sludge, and the large amounts of biosolids it contains, with their cell-bound water, has not previously been considered an energy source. Due to their large bound water content, biosolids have a negative fuel value and cannot be incinerated unless heated with expensive fuel that must be purchased. Such an incineration of biosolids may be desirable to avoid having to spread them on land, thereby eliminating or at least reducing possible environmental contamination, but at a very substantial cost, namely the additional heat that must come from the fuels to incinerate them.

The production of biosolids in the U.S. is estimated to be between 7.1 and 7.6 million (short) dry tons per year. Ocean dumping has been prohibited since the 1980s. The predominant disposition is spreading the biosolids on agricultural land as a fertilizer. Other dispositions are dumping in landfills and incineration.

In 1998, the production of biosolids in Europe was reported to be 7.2 million dry metric tons, and 25% was disposed to landfills. Production is expected to increase to at least 9.4 million metric tons in 2005, land application accounting for 54%, landfilling decreasing to 19%, and incineration growing to 24%—although incineration is estimated to cost five times as much as landfilling.

In 2001, biosolids production in Japan was reported to be 1.7 million dry metric tons. 40% was composted and the remainder was incinerated or used to produce cement.

After strenuous mechanical dewatering and digestion in sewage treatment plants, the solids concentration in biosolids still only ranges from about 14-30%, and is typically no more than about 20%, which means that every ton of biosolids, treated and dewatered in accordance with the prior art, is accompanied by about four tons of water, the bulk of which is bound in the dead cells. The cost of shipping the inert water limits the distance it can be moved from its source, usually a wastewater treatment plant (WWTP). These factors give biosolids a negative value. As a result, the WWTP must pay to have someone dispose of the biosolids. Such a payment is often called a "tipping fee".

As the options for biosolids disposal become more challenging and the disposal options are moved farther from the source, disposal costs and transportation costs have become increasingly significant economic burdens. To reduce this burden, industry has focused on volume and weight reduction. The wastewater industry has made extensive efforts to remove the water from the biosolids generated at treatment plants. A typical WWTP may employ centrifuges, belt presses, rotary presses or other processes to physically force the water from the biosolids. A polymer and other chemicals may be added to assist in dewatering. Nevertheless, such mechanical dewatering methods used by WWTPs are inefficient and costly and incapable of appreciably reducing the amount of water bound in the cells of the biosolids.

The U.S. Environmental Protection Agency (EPA) grades biosolids according to regulation "40 CFR Part 503" as Class A and Class B. This regulation concerns primarily the application of biosolids to agricultural land, to which there is vocal and growing environmental opposition. For example, environmentalists condemn the use of biosolids as a fertilizer because of their content of living disease-causing organisms (pathogens and viruses) and heavy metals (such as lead, mercury, cadmium, zinc and nickel), as well as their damage to groundwater quality. In addition, environmentalists raise concerns about "quality of life" issues, such as insects and odors, associated with biosolids. As such, land application of Class B biosolids is banned in a number of counties, and more counties and states are expected to follow. In one case, where 70% of the biosolids were Class B, the banning of land application in adjacent counties nearly doubled the tipping fee from about $125 per dry ton to about $210-$235.

Furthermore, the high cell-bound water content of biosolids makes their incineration difficult for many industries. For example, the cement industry is reputed to be the world's third largest energy user. It requires the equivalent of about 470 pounds of coal to make each ton of cement. To conserve fossil fuel, 15 cement plants in the U.S. burn fuel-quality hazardous waste, and about 35 other plants use scrap tires to supplement fossil fuel. A growing method of disposing of biosolids is to incinerate them in cement kilns. Since their net fuel value is negative, this practice is only viable because of the revenue received by the kiln operator, for example, from the tipping fee, since additional fuel, such as coal, must be fired to eliminate the water bound in biosolids. In addition, in the manufacture of cement, certain elements contained in biosolids, such as chlorine, phosphorus, sodium and potassium, are not desired because they adversely affect the quality of the cement.

In the past, the requirement to dispose of biomass in general was coupled with attempts to extract heat energy from it in order to reduce disposal costs and the environmental burden of landfills. Attempts to extract energy from such materials were limited to combusting low-grade fuels and solid waste. For example, previous processes for deriving fuel from municipal solid waste (MSW) generally focus on adding alkali to assist in the removal of the majority of contained chlorine in the form of PVC found in MSW. In addition, various methods for processing relatively low-grade carbonaceous fuel, such as sub-bituminous and lignite coals, are known to those of ordinary skill in the art. In both scenarios, however, low-grade fuels are used as raw materials.

A number of schemes for the pyrolysis of biosolids have been advanced. However, they all have been forced to contend with the fact that biosolids contain about four times as much water as solid material, even after conventional dewatering at the treatment plant, for example. It is impossible to reach pyrolysis temperatures until all of the water has been vaporized, which requires at least 4000 Btu per pound of solids, which, at best, might be equal to its fuel value, before allowing for capital and operating costs.

As the foregoing demonstrates, the disposal of biosolids has become increasingly expensive and controversial. A need exists in the art for a method to cleanly and economically dispose of biosolids. The current invention provides a method to dispose of biosolids while concurrently producing an economically more viable renewable fuel.

To the extent that biosolids alone cannot meet the growing demand for renewable energy, the biosolids conversion to a useable fuel in according with the present invention can be combined with extracting energy from other sources such as biomass. Thus, the present invention provides a method and system to convert biosolids, alone or with biomass, into a viable renewable fuel in an environmentally benign manner.

SUMMARY OF THE INVENTION

As understood by applicants, biosolids are composed primarily of dead cells which have cell-bound water. When subjected to sufficient pressure to keep the water liquid, a heating of a slurry or sludge containing biosolids to a first, relatively lower, temperature causes the biosolids cells to rupture, which liberates the water bound inside the cells and thereby converts the biosolids from a substance which cannot practically be dewatered to a new fuel from which the water can be readily removed mechanically. The further heating of the biosolids additionally splits off carbon dioxide, thereby lowering the oxygen content of the biosolids and converting the biosolids into char. Once dewatered, the char has a positive heating value and can be used directly as a fuel, thereby releasing the heat energy that was previously inaccessibly bound in the biosolids.

For example, in combination with a wastewater treatment plant (WWTP), the present invention provides a method to produce a viable, renewable fuel from biosolids by converting the biosolids into a relatively dry, combustible material. In many cases, the process can be integrated with the existing infrastructure of the WWTP. Since the treated biosolids have substantially no bound water, freed water from the cells can be returned to the WWTP. The remaining cell materials become much less hydrophilic, which gives them a positive heating value and allows them to be shipped to the desired destination at a much reduced cost. If the WWTP is equipped with an anaerobic digestion stage, the gas produced can support the fluid deoxidation with fuel used in its operation. Pathogens are destroyed, and when the dewatered biosolids are heated sufficiently to carbonize them, the resulting char product contains reduced levels of most water-soluble impurities, including sodium, potassium, sulfur, nitrogen, chlorine and organic compounds, which are separated with the excess water. Biosolids char is a new player on the energy scene and is a low-cost, renewable fuel for many energy-consuming industries.

Although acceptable to incinerators and landfills, biosolids char is most productively used where its energy content is utilized. For example, in one embodiment, the method and system of the present invention is used in conjunction with a cement kiln to increase the thermal efficiency of the cement kiln and cement manufacture, while disposing of biosolids that would otherwise constitute undesirable waste. In addition, the inert material found in the biosolids can become a part of the product. Therefore, not only is the heating value in biosolids utilized, but the inerts leave no negative by-products from this configuration.

Since biosolids are produced as a viscous slurry, little preparation is required, except blending for uniformity. Following heating of the biosolids slurry under pressure to a temperature at which the cell walls rupture, the further heating of the biosolids results in a significant molecular rearrangement of the cells, splitting off of a substantial proportion of its oxygen as carbon dioxide, which carbonizes organic substances and yields so-called char that is readily incinerated. The temperature necessary for this molecular rearrangement varies but is typically between 177° C. and 315° C. (350° F. and 600° F.). The aggressively hydrolyzing conditions free anions to dissolve in the aqueous phase. Previously bound cations, such as sodium and potassium, are likewise made accessible to aqueous dissolution and subsequent removal and/or disposal.

Compared to the incineration of (raw) biosolids, in cement kilns or dedicated incinerators, the positive energy content of biosolids char substantially decreases the amount of supplemental fuel which must be purchased. Moreover, soluble cations, sources of low temperature slag in boilers and undesirable in cement, have been largely removed with the freed water.

Cement kiln and incinerator facilities may prefer for the char to be dewatered to a maximum extent, resulting in the delivery and charging of a wet solid "char" containing only about 40% to 50% water, which is about one-fifteenth of that found in the raw biosolids. Alternatively, transport and handling considerations may cause such facilities to prefer char which has been dried and compacted or pelletized. The present invention has the capability to deliver char in either form.

In addition, the biosolids char produced with this invention, with or without char from other substances such as biomass, for example, provides a fuel that is useful to a variety of other fuel-consuming industries, including blast furnaces, foundries, utility boilers, the power industry, the paper industry, and other fossil fuel-utilizing industries. For example, the present invention contemplates a green power station where biosolids char is charged to a pulverized fuel or fluidized bed combustor to generate steam, or to a gasifier feeding clean fuel gas to an integrated gas-fired gas turbine combined cycle.

Furthermore, the char produced by the present invention can be the raw material for hydrogen fuel cells through partial oxidation to a fuel gas (largely carbon monoxide and hydrogen), followed by the water gas shift and the separation of carbon dioxide, as practiced in synthetic ammonia technology. It can be "refined" into liquid fuels by adaptations of "catalytic cracking", "delayed coking" and "hydrocracking", patterned after the established processes well known to the petroleum refining industry.

While the present invention is directed to the economic and ecologically sound disposition of biosolids, it can be combined with appropriately treated other substances, primarily biomass that requires disposal, including, but not limited to, paper mill sludge, food waste, agricultural wastes, hog manure, chicken litter, cow manure, rice hulls, bagasse, green waste, municipal solid waste, medical waste, paper waste, wood and wood waste, palm oil residue, refuse derived fuels, Kraft Mill black liquor, and short rotation energy crops, as well as hydrophilic non-renewable fuels such as low-rank coals.

In particular, the present invention relates to a process of converting biosolids into an economically viable fuel by applying sufficient pressure to the biosolids to maintain liquidity, heating the pressurized biosolids to a sufficient temperature to rupture cells and then to evolve carbon dioxide, depressurizing the resulting char slurry, separating the carbon dioxide from the char slurry, and removing at least a portion of the aqueous phase from the char slurry to provide an at least partially dewatered char product for further use. Additionally, the invention relates to reacting the dewatered char product with a gas comprising oxygen to thereby convert its fuel value into thermal energy and using the thermal energy or incinerating the fuel.

In sum, the present invention provides an environmentally acceptable disposition of biosolids, as well as energy for various energy consumers, such as cement kilns and electric power plants. In addition, the present invention provides:

a method to increase the availability and environmental acceptability of renewable fuels;

a method to minimize the quantity of wastes to be landfilled;

a process to reduce the moisture (water) content of waste going to landfill;

a process to raise the softening point of renewable fuel ash to reduce fouling and slagging;

a method of converting a non-uniform solid fuel, such as agricultural and forestry waste and/or paper mill sludge, into a uniform fuel;

a method to convert a bulky fuel into a fuel that is compact and easy to store and transport;

a process to convert a perishable fuel into a sterile fuel that is storable without deterioration;

a method to provide an economical means of co-firing an otherwise non-compliant fuel;

a method to provide a thermally efficient combination of liquid deoxidation and at least one of a wastewater treatment plant, a cement kiln, and a thermal power station;

a method to dry biosolids prior to introduction to a cement kiln or other similar facility;

a method to reduce the amount of water introduced to a cement kiln and other combustors;

a process to co-process multiple feedstocks utilizing fluid deoxidation;

a method to utilize the ash in biosolids and other biomass;

a method to remove (and recover) elements found in biosolids or other biomass such as phosphorus, chlorine or $CO_2$; and a process to remove the water from biosolids and biomass in order to further refine these materials or to reduce disposal costs or to utilize for fertilizer.

Thus, the present invention provides a method for the disposal of sludge generated at sewage and wastewater treatment plants in an economical and environmentally benign manner. The method is economically benign because the end product is ash that is free of odors, as well as harmful substances such as viruses or pathogens, and the ash has a small volume and is readily disposed of. The method is further economically viable because at the front end it benefits from the willingness of treatment plant operators to pay a tipping fee in order to dispose of the difficult-to-handle sewage sludge, and further because, at the other end of the cycle, the sludge will have been converted into a fuel with a positive heating value that can be used to generate further revenue or other items of value in the form of payments for the generated heat energy or, for example, trading the extracted heat for credits, desired products and the like.

Additional embodiments of the present invention will be apparent from the description and the drawings of this application.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
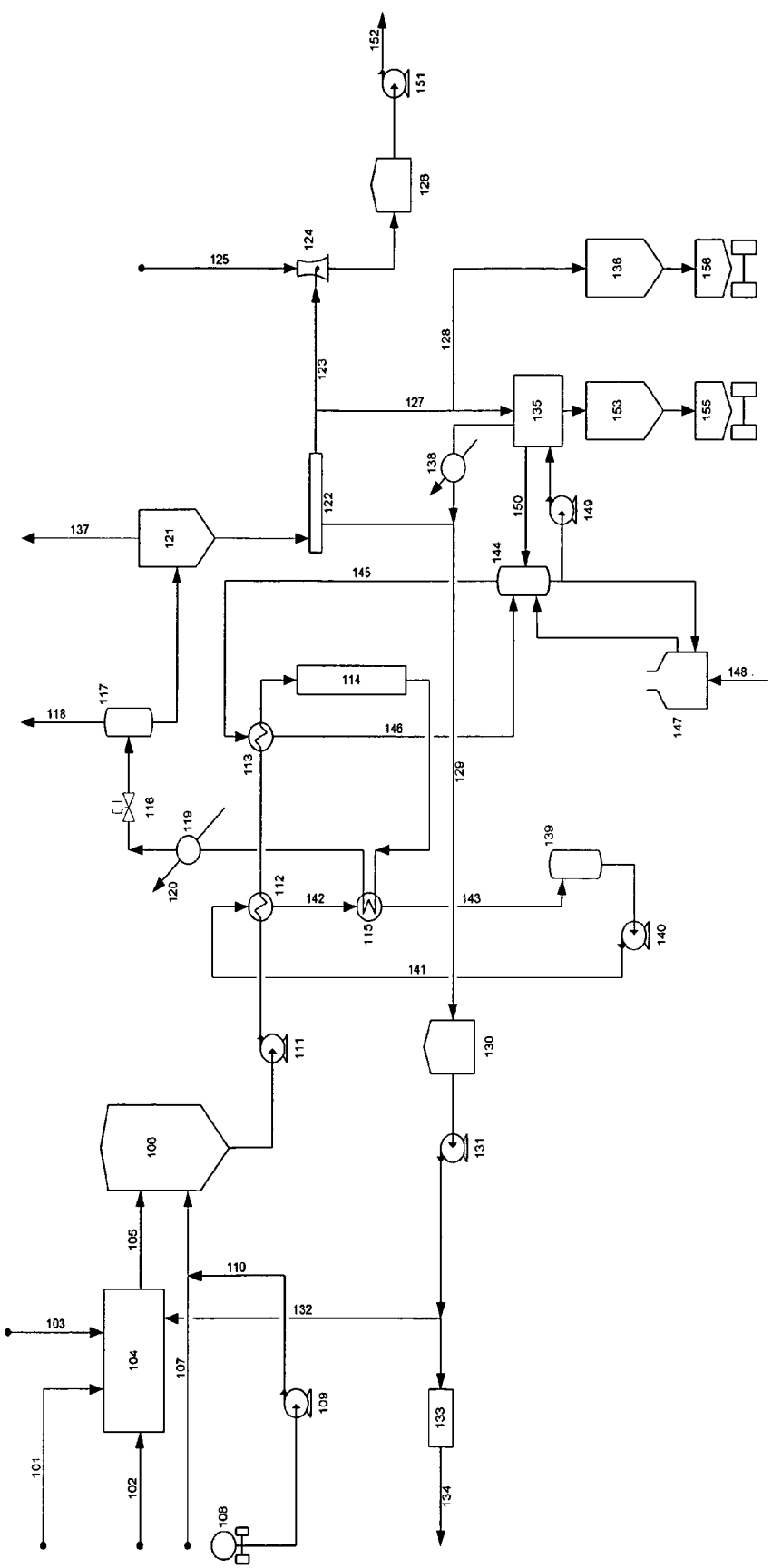
FIG. 1 is a schematic flow diagram illustrating the process of the present invention for converting biosolids into a high energy density slurry or dry solid fuel as a renewable energy source.

FIG. 1 illustrates the conversion of biosolids to a viable renewable fuel. Biosolids may be delivered as sludge via a pipeline 107 from an adjacent wastewater or sewage treatment plant (WWTP) to a raw feed tank 106. Alternatively, biosolids may be delivered by a truck 108 and pumped by a sludge pump 109 via a line 110 to the tank 106.

Alternatively, the raw feed tank 106 can receive biosolids from multiple sources and be utilized as a mixing vessel whereby more dilute biosolids are mixed with thicker, more viscous biosolids to render a more pumpable feed. A commingling and slurrying facility 104 can also be utilized for this purpose.

In addition, the raw feed tank 106 or comminuting commingling and slurrying facility 104 can be the points whereby polymer is added to reduce the water content of the biosolids slurry or, alternatively, where water is added if the viscosity of the slurry is an issue.

Heat may be added to the tank 106 to enhance the viscosity of the biosolids. In addition, a shearing or grinding step may be added, for instance between the raw feed tank 106 and a pumping device 111. This shearing or grinding will lower viscosity as well as achieve the particle size uniformity necessary for optimal operation of a pressure let-down valve 116. Addition of heat, shearing and grinding will also enhance the performance of the pumping device 111 and allow a higher solids content material into the system.

In one embodiment, a screening device is added to remove large particle-size items to enhance the performance of any grinding, the pumping device 111 and/or the pressure let-down valve 116. For example, the screening device may be placed between the raw feed tank 106 and the pumping device 111. In another embodiment, the raw feed tank 106 or a similar device can be used to add a chelating agent or other suitable chemical to remove phosphorus or other elements found in the biosolids.

From the raw feed tank 106, the biosolids slurry is pumped to a pressure that will keep the water in the slurry in liquid phase during subsequent heating operations. For example, in one embodiment, the slurry is at a pressure ranging from about 400 to 1200 psi. In another embodiment, the pressure of the slurry is between about 250 to 1600 psi. Care must be exercised to provide a pumping device 111 with an adequate net pump suction head (NPSH), either hydraulically or by mechanical assistance, as with a screw conveyor, considering that the slurry may be very viscous and may carry dissolved gases.

An alternative (not shown), for reducing the service of the pumping device 111, is the addition of booster pumps in the process anywhere between the pumping device 111 and the let-down valve 116. A further alternative (not shown) for reducing the service of the pumping device 111 is the addition of freed water or reacted slurry before the pumping device 111.

The biosolids slurry is pumped through heat exchangers 112 and 113 before passing to a reactor 114. While passing through the heat exchanger 112 the slurry is heated by exchange with hot liquid heat transfer fluid (HTF), such as Therminol 59. In another embodiment (not shown), the slurry may be heated via heat exchange with steam, either directly or indirectly. The outlet temperature of the slurry leaving heat exchanger 112 may range from about 150° C. to 315° C. (300° F. to 600° F.), and is preferably between about 200° C. to 260° C. (400° F. to 500° F.). While passing through the heat exchanger 113, the slurry is further heated to the desired temperature at which the biosolids cell walls will rupture and to liberate water bound in the cells. The temperature is further preferably set so that the other constituents of the biosolids cells are carbonized to convert these constituents to char by heat exchange with hot liquid HTF. In an alternate embodiment, the condensing vapor of a vaporizable HTF, such as Therminol VP-1, is used to heat the slurry to the desired temperature. In one embodiment, this temperature is between about 200° C. to 260° C. (400° F. to 500° F.). In another embodiment, the temperature is between about 150° C. to 260° C. (300° F. to 500° F.). In still another embodiment, the temperature is between about 260° C. to 350° C. (500° F. to 650° F.).

While the design of the heat exchangers for use with the present invention is not critical, each may comprise two or more shells. The shells may be in parallel or in series. In one embodiment, the heat exchangers 112 and 113 are arranged in a series such that the biosolids slurry passes through heat exchanger 112 prior to heat exchanger 113.

The reactor 114 (which may comprise one or more reactors in parallel or series) provides time at elevated temperature to first rupture the biosolids cells and further to complete the deoxidation reactions to convert the cell constituents to char. While a continuous reaction is discussed here, the present invention also contemplates a batch or semi-batch reaction. As known to those of ordinary skill in the art, the methods for heating the batch reactors can be similar to those for a continuous reactor. For example, a batch reactor may be heated by direct steam injection, heating coils, or a combination thereof.

One suitable alternative (not shown) for reactor 114 is a reactor-stripper tower. Such a tower has side-to-side baffles (or other vapor-liquid contacting media) arranged for downflow of partially heated slurry from the exchanger 112 contacting an upflow of steam and stripped carbon dioxide from a "reboiler" (the equivalent of exchanger 113), receiving char slurry from the base of the tower. The tower preferably has a top-to-bottom temperature gradient from approximately the slurry outlet temperature of the exchanger 112 to a temperature somewhat lower than that leaving the illustrated simple reactor. In one embodiment, the temperature gradient ranges from about 200° C. to 260° C. (400° F. to 500° F.). In another embodiment, the temperature gradient is between about 150° C. to 315° C. (300° F. to 600° F.). The carbon dioxide leaving the top of the reactor-stripper contains appreciable water vapor that needs to be condensed in a new condenser to distilled water and separated from carbon dioxide which leaves via a line 118. While the let-down valve 116 and separator 117 are still required, little carbon dioxide remains to be separated in the separator.

The slurry leaving the reactor (or reactors), referred to as char slurry, consists of destroyed biosolids cells from which the bound water has been freed and which has also undergone fluid deoxidation, i.e. a molecular rearrangement characterized by splitting off carbon dioxide, resulting in a substantial increase in solids carbon content and a substantial decrease in solids oxygen content. For example, char samples are comprised of about a 2% to 15% increase in solids carbon content, preferably with about a 4% to 12% increase. In one embodiment, the solids oxygen content decreases by about 35% to 50%. In another embodiment, the slurry undergoes a decrease in solids oxygen content of about 30% to 70%.

Char slurry flows from the reactor 114 to the heat exchanger 115, where it is partially cooled by giving up heat to the liquid HTF which comes to it from the exchanger 112 via a line 142. In one embodiment, the char slurry is cooled to a temperature ranging from about 150° C. to 200° C. (300° F. to 400° F.). In another embodiment, the temperature of the char slurry after leaving heat exchanger 115 is between about 100° C. to 260° C. (200° F. to 500° F.). The liquid HTF circuit is completed by a liquid HTF receiver 139, a liquid HTF pump 140 and connecting lines 141, 142 and 143.

The services of the heat exchangers 112 and 115 (FIG. 1) could be performed by a single exchanger 160 (FIG. 1A) having the cold feed slurry on one side and the hot char slurry on the other, which would require passing slurries through both the tube and the shell sides. Any deposits on the tube side of the heat transfer service would be relatively easy to clean. Fouling on the shell side would be difficult to correct, however, and heat transfer coefficients are much lower with a product-to-product exchanger. As such, the present invention contemplates dividing the service into two exchangers, with clean HTF being a "go-between", both hot and cold slurries then being on the tube sides, with only clean HTF on the shell sides. The duties of the two exchangers are essentially the same (differing only by radiation loss), the temperature ranges of the circulating HTF seeking their own equilibrium.

Figure 1A:
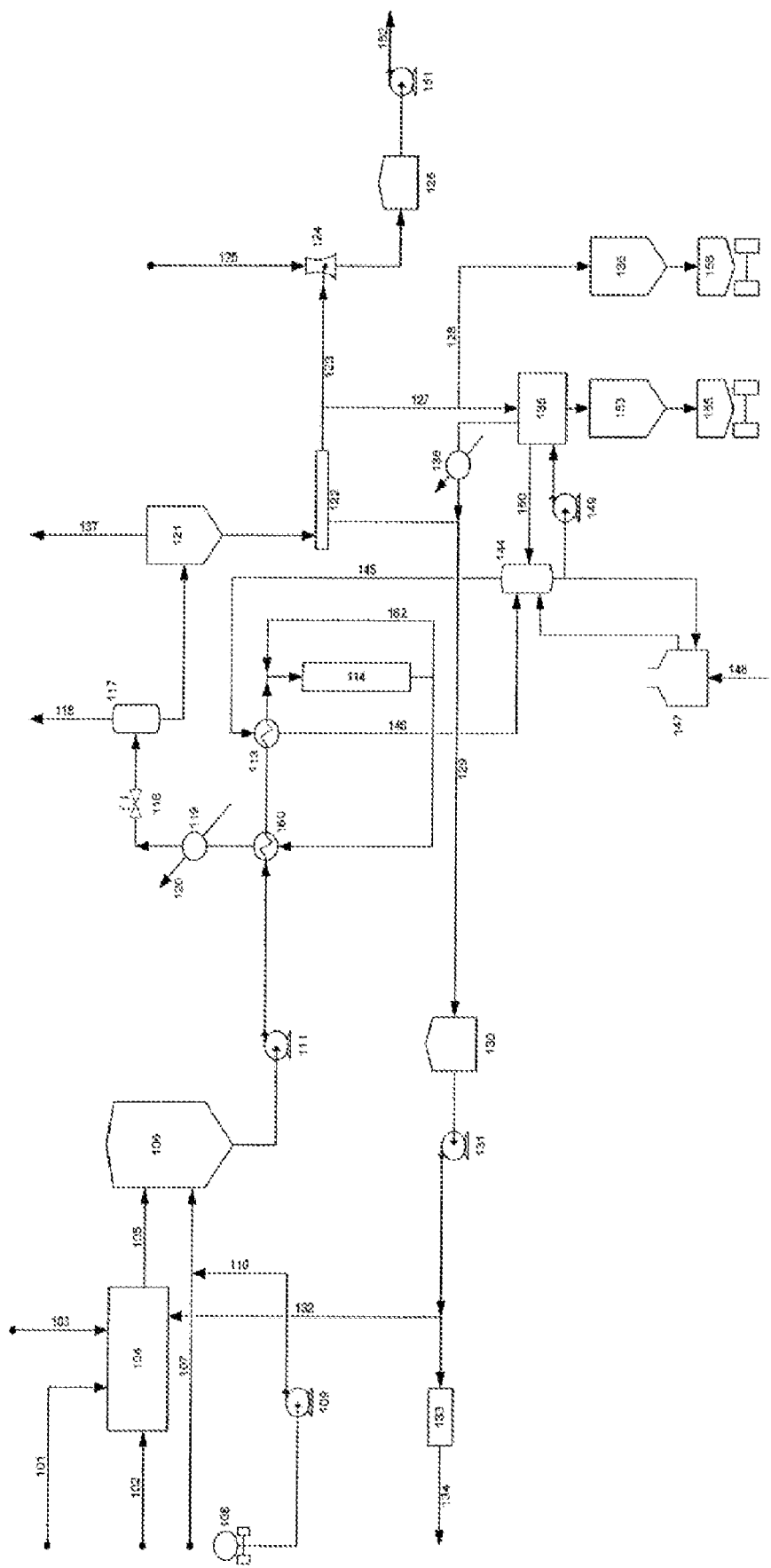
FIG. 1A is a schematic flow diagram similar to FIG. 1 illustrating another process of the present invention for converting biosolids into a high energy density slurry or dry solid fuel as a renewable energy source.

In one embodiment, reacted biosolids char leaving the reactor 114, while still under pressure, is recycled via recycle line 162 back to the pressurized biosolids slurry before it enters the reactor 114, as shown in FIG. 1A, in order to facilitate heating and reduce the viscosity of the slurry prior to biosolids cell destruction and subsequent deoxidation.

Vaporized HTF flows from a receiver 144, through a line 145, to the hot side of the exchanger 113, in which it is condensed by the transfer of heat to partially heat the biosolids slurry, and then flows by means of a line 146 back to the receiver 144. Liquid HTF flows from the receiver 144 by natural convection (or a furnace charge pump, not shown, if pressure drop requires this) through the coils of a fired heater 147, where it is partially vaporized by heat supplied by a fuel source 148 and flows back to the receiver 144. In one embodiment, the fuel source is natural gas, propane, fuel oil, char slurry, char, or any combination thereof. In an alternate embodiment (not shown), a combustion device, such as a fluid bed, is employed to use char, char slurry, or a combination of char and an outside fuel source or waste source. In another embodiment (not shown), a gasifier is employed to use char, char slurry, or a combination of char and an outside fuel source or waste source. In yet another embodiment, a boiler is used to generate steam for process heat. The boiler could use char, char slurry, or a combination of char and an outside fuel source or waste source.

An HTF pump 149 takes suction from the bottom of the receiver 144 and circulates liquid vaporizable HTF to a facility 135 as a source of heat for char drying. After serving this purpose, it is returned, via line 150, to the receiver 144. The pump 149 may also serve other auxiliary heating services (not shown) such as to a jacket for the reactor 114 to prevent heat loss.

After being partially cooled in the heat exchanger 115, the now-fluid char slurry flows through a cooler 119, in which its temperature is lowered to near ambient by exchange with plant cooling water from a line 120. The cooled char slurry flows from cooler 119 to an automatic pressure let-down valve 116, which has been responsible for maintaining the aqueous slurries under sufficient pressure to avoid vaporization. The pressure let-down valve 116 reduces the pressure of the char slurry to a nominal pressure above atmospheric. This is achieved by liberating gaseous and dissolved carbon dioxide, which is separated from the char slurry in a separator drum 117. Evolved carbon dioxide exits the separator drum 117 via a line 118.

The pressure let-down valve 116 is subjected to strenuous conditions and has a high potential for clogging. Certain steps can be performed, however, to minimize these difficult conditions. For example, as previously mentioned, grinding or screening can be performed anytime before the pressure let-down valve 116. In addition, a step prior to the pressure let-down valve 116 of further cooling the reacted slurry after the heat exchanger 115, as shown, will reduce the amount of evolved gas and reduce the acceleration of particles across the pressure let-down valve 116. Those of ordinary skill in the art will appreciate that several cooling techniques are suitable for use with the present invention. Cooling techniques could include counter-current shell and tube or double-pipe exchanger cooled by plant cooling water.

Because foaming may occur in either the storage tank 121 or the drum 117, it may be advantageous to control foaming by letting down pressure in two or more stages. In another embodiment, foaming may be controlled by using a spray nozzle from the lower part of the drum 117 to spray a side stream into the drum 117.

Some dissolved carbon dioxide separates in the tank 121 and leaves via a line 137. If there is a use or market for carbon dioxide, this gas, along with that evolved in the drum 117, leaving via the line 118, may be subjected to purification. Otherwise, it will be collected and discharged through the flame of a fired heater 147 to destroy traces of odor-causing gases and/or for energy recovery. Approximately 25 to 27 pounds of carbon dioxide are released per ton of wet biosolids processed. Any sulfur compounds in the carbon dioxide will be treated with the necessary pollution control devices. All vent gases are conducted to the fired heater 147 to destroy traces of odor-causing gases.

Liquid char slurry flows from the bottom of the tank 121 to a dewatering facility 122, where one or more commercially-available devices for the mechanical separation of liquids and solids is employed to separate the freed water from the char solids. Suitable separation devices may include, but are not limited to, thickeners, hydroclones, centrifuges, pressure and vacuum rotary filters, horizontal filters, belt and rotary presses, and the like.

Liquid char slurry in the tank 121 will contain some heat and may be ideal for a further step of adding a chelating agent or other chemicals to remove phosphorus or other elements found in the original biosolids. The chelating agents discussed above are also suitable for use at this stage in the process.

Char solids leave the dewatering facility 122 via a conveyance means 123. Some or all of them may be directed to an eductor 124 in which they are mixed with sufficient water from a line 125 to form a pumpable, high energy density fuel slurry. The fuel slurry is accumulated in a tank 126 for off-loading to a pipeline or tank truck, as required, by means of a fuel slurry pump 151 and a line 152. Alternatively, the damp char may be conveyed by conveyance means 127 and 128 to a damp char hopper 136 to be off-loaded, as required, into hopper-bottom trucks 156.

Alternatively, part or all of the char leaving the dewatering facility 122 can be directed to a drying and/or pelletizing facility 135 via conveyance means 127, which, utilizing commercially-available equipment, dries and compacts or pelletizes the solids. Heat required for the drying is supplied by a stream of hot liquid HTF from a vaporizable HTF receiver 144 by a HTF pump 149 which, after providing the necessary heat, is returned, via line 150, to the receiver. Dried char fuel is accumulated in a dried char silo 153, to be off-loaded to hopper-bottom trucks 155 and transported to market. In one embodiment (not shown), dried char fuel is cooled prior to being accumulated in the dried char silo 153. In another embodiment, the dried product is stored under nitrogen blanket to prevent dust explosions and fire in the event that the product is not transported directly from the facility. Evaporated water from the dryer 135 flows through a condenser 138, and the condensate is transported via a line to the freed water tank.

In one embodiment (not shown), the heat required for the drying facility 135 can be produced by at least one of the methods of a fluid bed, boiler, or combusting gas from a gasifier. The fuel source for the heat required for the drying could be at least one of char, char slurry, or a combination of char and an outside fuel source or waste source. In one embodiment (not shown), the gas from a digester at an adjacent wastewater treatment plant is utilized as fuel for at least one of the process heater and the dryer.

Although not shown in FIG. 1, nor entirely renewable, char dried in the drying facility 135, but not pelletized, may be diverted to a mixing device with which it is incorporated into a fuel oil. The technology resembles that of the coal-oil mixture (COM) programs developed and tested in the 1980s. While not conforming to existing fuel oil specifications, such an addition would add heating value and, in some cases, reduce the sulfur content at low cost. This new fuel is of interest for users where ash is not a problem, such as in cement kilns and blast furnaces. Although any grade of distillate or residual fuel oil can be used, most likely candidates are off-spec slop oils, refinery fuel, used lube oil, and the like. The oil-char slurry is also attractive for in-plant fuel uses.

Freed water separated from damp char in the facility 122 flows through a line 129 to a freed water tank 130, from which it is pumped by a freed water pump 131, either via a line 132 to a comminuting and slurrying facility 104 and/or tank 106, and/or it is returned to the wastewater treatment plant (WWTP) via line a 134. Depending on the rate scale for treatment at the WWTP, it may be economical to employ some pretreatment, by known commercial means, in a pretreatment facility 133. Any sludge which is derived from the pretreatment facility can be conveyed to the drying facility 135. As discussed earlier, the dried product may be stored under nitrogen blanket or other method to prevent dust explosions.

While the process flow diagram of FIG. 1 has been described with respect to the treatment of large amounts of biosolids, as accumulate most frequently at municipal sewage and wastewater treatment plants, those of ordinary skill in the art will appreciate that other substances, such as biomass, can be dewatered with the general process of the invention in addition to the biosolids to enhance the amount of fuel being generated. For example, fluid biomass wastes, such as paper-mill and paper recycling sludges, may be charged via a tank truck 108 or a pipeline 107 or a pump 109 and line 110. If the waste contains appreciable amounts of chlorine compounds, alkali of at least the chemical equivalent of the chlorine is also added (not shown). Solid biomass wastes, as from agriculture and forestry, may be charged via a conveyor 101 to the comminuting and slurrying facility 104, employing known technology described, for example, in U.S. Pat. No. 5,685,153, the entire disclosure of which is incorporated by reference herein. Low-grade carbonaceous fuels, such as Powder River Basin sub-bituminous coal, may alternatively or additionally be charged to the facility 104 via a conveyance means 102. Recycled water is added to the facility as required for specified slurry viscosity by means of the line 132, and/or fresh water by means of the line 103. As outlined above with respect to the biosolids, the slurried hydrophilic feedstock is transferred via a line 105 to the storage tank 106.

The high reactivity of the biosolids char, as produced by a unit exemplified by FIG. 1, has been noted. This property of its carbonaceous molecules will be useful to a gasification facility, or a chemical plant using it as raw material for oxygenated organic compounds, either low molecular weight (such as acetic acid, alcohols, aldehydes and ketones) or higher molecular weight detergents, surfactants, plasticizers, lubricating oil additives, and the like. Among the future possibilities for char gasification is the shifting of the CO content of the gas to carbon dioxide and hydrogen, with subsequent separation of the carbon dioxide to yield hydrogen for fuel cells. This separation may well be performed by the new metal-ceramic membranes being developed for the U.S. Department of Energy (DOE) FutureGen project, in collaboration with Oak Ridge National Laboratory and Eltron Research.

Figure 2:
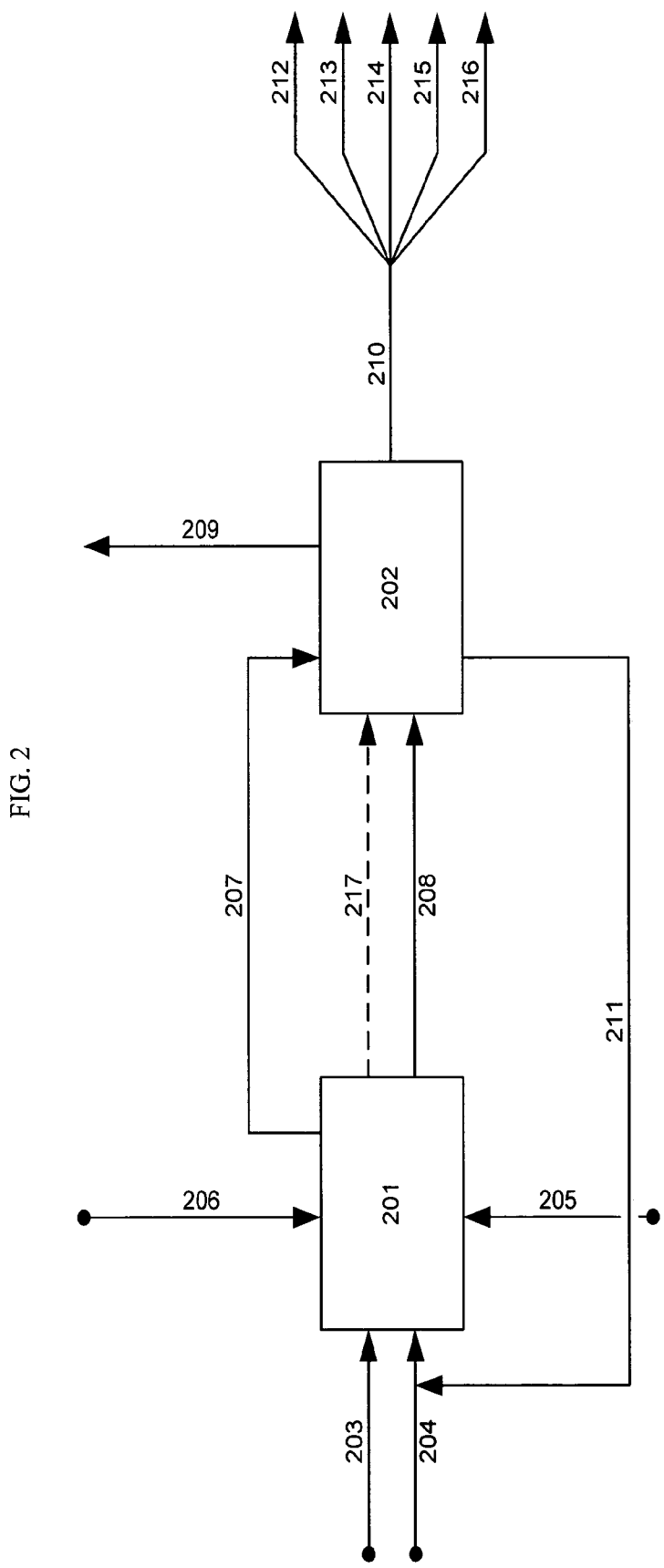
FIG. 2 is a flow diagram in which the process of the present invention is used in a wastewater treatment plant.

FIG. 2 is a flow diagram of a combination of a wastewater treatment plant (WWTP) operating in accordance with the present invention and, adjacent thereto, an efficient biosolids processing facility operating in accordance with the present invention and employing fluid deoxidation to economically convert biosolids into a combustible material, resulting in the elimination of most of the water from WWTP biosolids, and particularly the water bound in the biosolids cells, that otherwise inflate the cost of transporting and/or evaporating the water from the biosolids and thereby make the use of biosolids unfeasible. Combustible gas from the WWTP's anaerobic digestion may be used to provide heat needed for the deoxidation, thus saving the cost of purchased fuel. Furthermore, treated water from the WWTP can be utilized for slurrying water for the fluid deoxidation unit. Moreover, the WWTP can also treat the effluent from the deoxidation unit.

In particular, WWTP 201 receives storm drainage via one or more conduits 203 and sewage via one or more conduits 204. Using known technology, a WWTP typically employs atmospheric air entering via a conduit 205 and various customary additives, such as flocculants and lime, via a transport system 206. This conventional treatment of sewage and wastewater results in the production of a digester gas, leaving the WWTP via a conduit 207, which is utilized as a fuel source for the present invention. The treatment produces a viscous sewage sludge, i.e. a sludge or slurry of biosolids leaving through a line 208. The concentration of solids will typically be in the range of between about 3% to 40% and averaging about 20%. Because biosolids contain about 80% bound water, they are expensive to haul to acceptable disposal sites, to combust with the water present, or to attempt to physically dewater them.

A deoxidation unit 202, employing the process of FIG. 1, is installed as close as feasible to the source of the biosolids. By rupturing the cellular structure and splitting off carbon dioxide from the molecules making up the biosolids, the slurry is readily mechanically dewatered to contain about 35% to 65% solids. The now-separable (freed) water (about 90% of that in the raw biosolids) is recycled to the WWTP through a line 211, where it may be pretreated with membranes, ammonia removal technologies, anaerobic digestion technologies, or reverse osmosis technologies. Upon drying, the char remaining has only about 15% to 17% of the weight of the raw biosolids, resulting in large cost savings for transporting the char to a point of use or disposal.

Undried low-moisture char, exiting via suitable means 210, may be acceptable at a nearby landfill, to which it is transported by a suitable conveyor or carrier 212. It may similarly be transported to a nearby incinerator, via a means 213, where its incineration will require much less fuel than the corresponding raw biosolids would consume. In addition, either dried or undried char may be transported to a nearby cement kiln, via a means 214, where it requires significantly less purchased fuel than would be needed for an equivalent amount of raw biosolids. The char may also be transported, via a means 215, to a chemical plant where (aided by high reactivity) it is readily converted to fuel or synthesized gas, to oxygenated compounds, to carbon fibers, to fertilizer production, and/or to landfill. The low-moisture char may be transported, by a means 216, either as a pumpable slurry or as dry pellets, to a thermal power station where its high reactivity permits efficient combustion with low excess air and high carbon burnout.

Equally as significant as the flow of materials and energy is a flow of money, in the form of a tipping fee, from the WWTP to the biosolids processing unit, as indicated by a dashed line 217. The tipping fee is the fee paid by the WWTP to the owner of the processing unit for managing its biosolids.

Since the supply of the new fuel discussed above will initially be small, it is optimal for local use. As such, one of the first fuel users to accept it is likely to be cement kiln operators, since they can to a large extent tolerate its high ash content. Other suitable areas of use are blast furnaces and foundries, since they are accustomed to firing coal or coke and to disposing of ash with other impurities as slag. As the supply of biosolids char increases, it will become of interest to general coal users, including thermal power stations. Such applications are addressed in more detail in the remaining figures.

Figure 3:
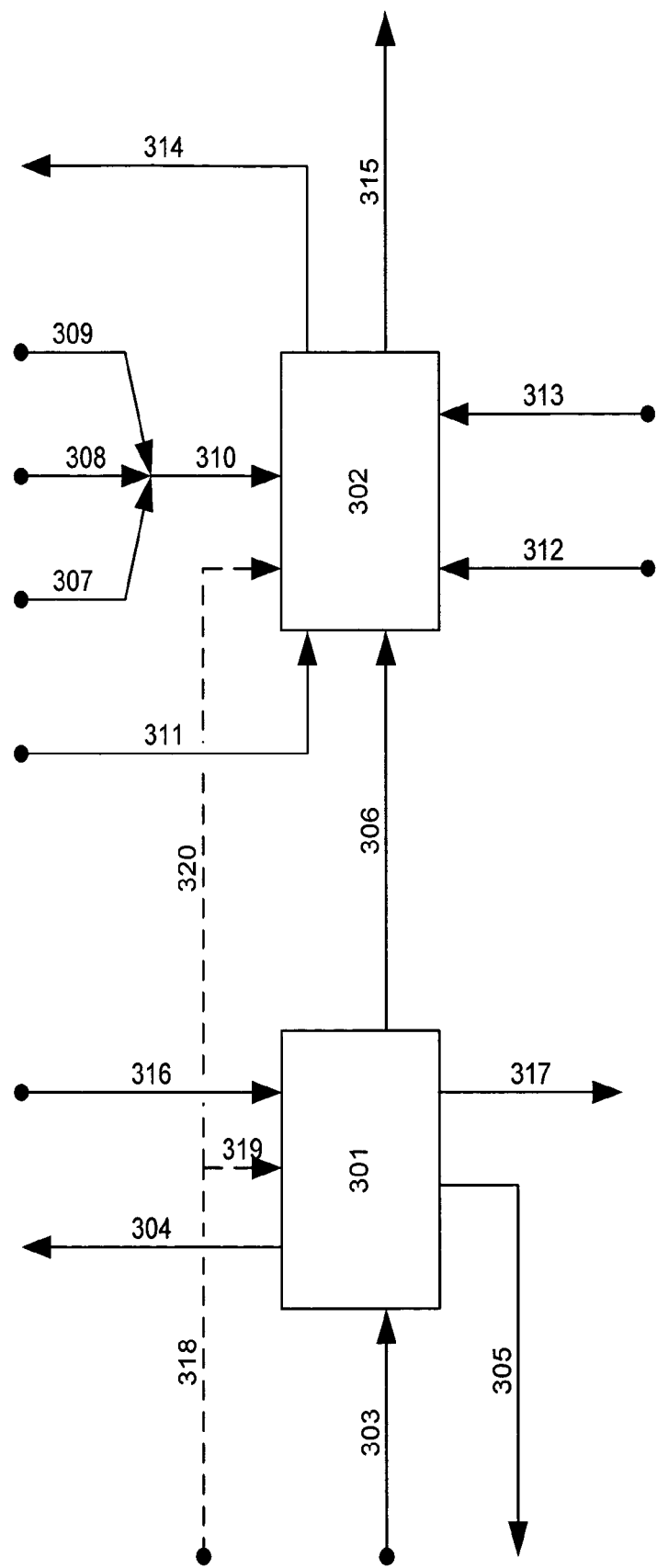
FIG. 3 is a flow diagram in which the process of the present invention is used in the operation of a cement kiln.

For example, FIG. 3 is a flow diagram illustrating an efficient biosolids processing facility for converting biosolids into a combustible, preferably carbonized material that is combined with a cement kiln. This aspect of the present invention highlights the drastic reduction of water that would otherwise accompany raw biosolids into the kiln, enabling a substantial increase in the amount of biosolids consumed, with a proportionate increase in tipping revenue received by the processor and Btus charged to the kiln.

In particular, a fluid deoxidation unit 301, employing the process described with respect to FIG. 1, is installed as close as feasible to one or more WWTPs, the source of the biosolids, as indicated by a transport means 303. By rupturing the biosolids cell walls and discharging carbon dioxide that may be formed at the same time (line 304), the resulting char can now be readily mechanically dewatered to comprise about 35% to 65% solids. The now-separable water (about 90% of that in the raw biosolids) is recycled to the WWTP through a line 305 or is used as recycle water for process slurrying.

Char, either as a concentrated slurry, a wet solid, or a dried solid, is transported to a cement kiln 302 via a transport means 306. The basic ingredients of Portland cement (limestone, clay and shale) are charged via conduits 307, 308 and 309, and are ground, mixed and charged to the kiln through a conduit 310. In a preheat section, these ingredients are contacted counter-currently with hot flue gas, which raises the temperature to drive off water of crystallization and calcine the limestone. Near the bottom of the preheat section, waste combustibles, such as used tires and broken asphalt, are charged through a conduit 311. If necessary to achieve the desired temperature, fuel such as coal, oil or gas is fired, together with combustion air, into the lower part of the preheat section. The preheated mix is then discharged into one end of a horizontal, rotating kiln.

As the preheated ingredients travel to the opposite end of the rotating kiln, they are further heated to the temperature necessary for them to react and form cement clinker by firing, at a discharge end, primary fuel delivered through a conduit 312 (which may include biosolids char), along with the corresponding combustion air supplied via a combustion air fan (not shown) and a conduit 313.

Flue gas, from which most of the sensible heat has been recovered, leaves the kiln via an exhaust fan and dust recovery equipment (not shown) through a line 314. Cement clinker exits the kiln via heat exchange with combustion air, through a conduit 315. The cooled clinker is ground and blended with gypsum to form Portland cement.

Most of the ash constituents of biosolids char are tolerable in Portland cement, with the exception of soluble cations, such as sodium and potassium and the sulfates and chlorides, which go primarily to the effluent from the liquid deoxidation unit and are returned via a conduit 305 to the WWTP. The exception is phosphorus, which often is bound in insoluble form by iron. It is possible that the phosphorus content could limit the amount of biosolids char a given cement kiln can accept. Should the content of phosphorus in the char produced by the unit 301 be so high as to limit the amount of biosolids char that can be accepted in the cement clinker, a chelate solution (or other solublizing agent) may be employed via a line 316 to extract some of this element. The phosphorus-containing extract is then discharged through a line 317 and must be disposed of in a manner that avoids returning it to the WWTP.

The inorganic fraction of biosolids can be as high as about 50% on a dry basis. This inherent ash found in biosolids can reduce the quantities of limestone, clay and shale input in lines 307, 308 and 309, respectively. If unit 301 is located near the cement kiln 302, a portion of a wastewater stream 305 can be utilized in the cement kiln 302 for cooling or other purposes, or in NOx reduction. Waste heat from the stream 314, or other waste heat streams, including radiation heat, can be utilized by unit 301 as process heat for the system including heating the feed material, process heat, or drying the reacted product. Evolved carbon dioxide from the stream 302 can be conducted to the cement kiln 302 for heat recovery or odor reduction.

Equally as significant as the flow of materials and energy is a flow of money, in the form of tipping fees, from the WWTP to the combination of units 301 and 302, as indicated by the dashed line 318. A portion of the fee goes to the owner of the unit 301, as indicated by a dashed line 319, and the remainder goes to the owner of the cement kiln 302 as indicated by a dashed line 320.

Figure 4:
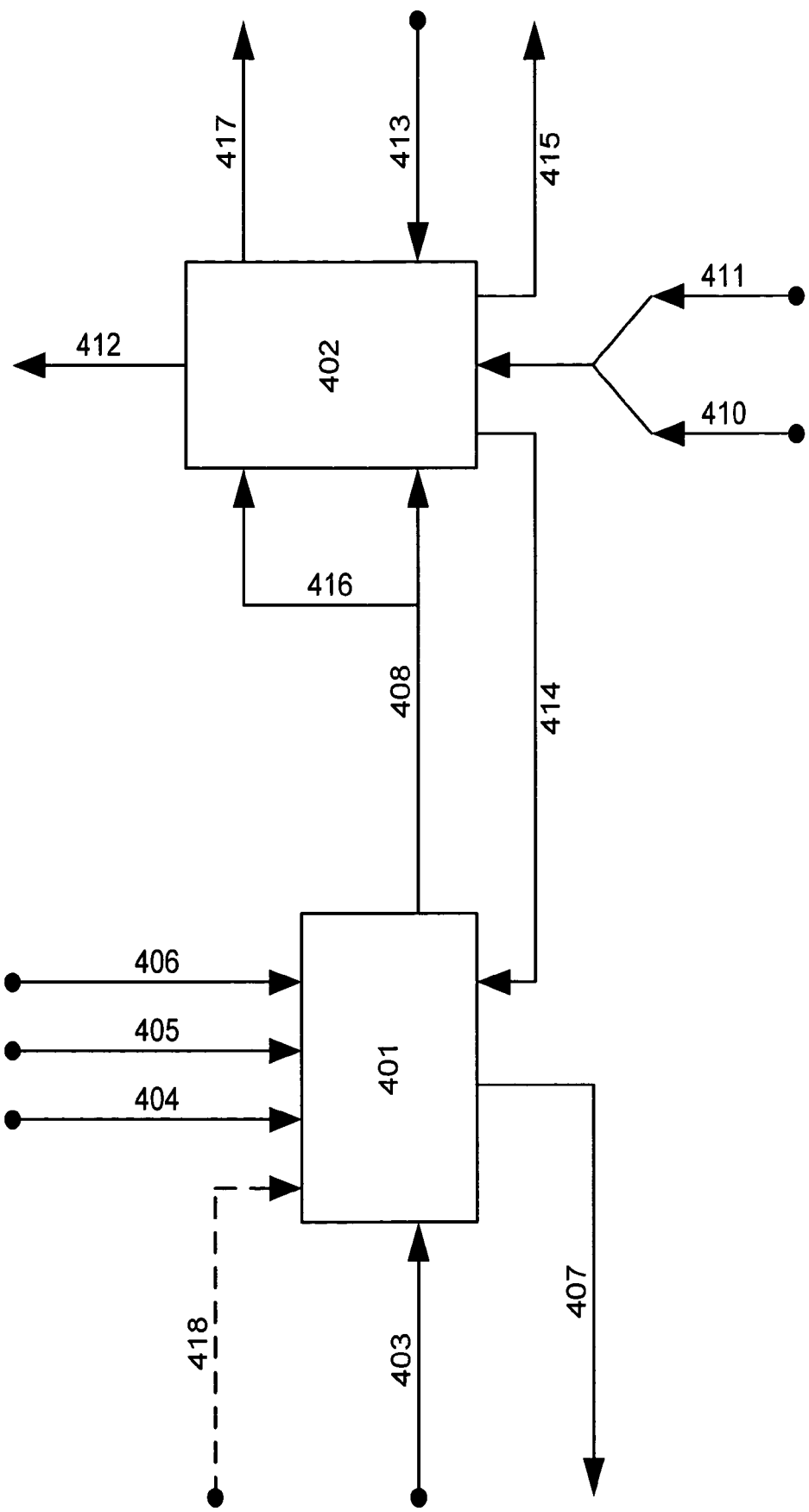
FIG. 4 is a flow diagram in which the process of the present invention is employed in the operation of a thermal power station using additional fuels, such as low-rank coals.

FIG. 4 is a simplified flow diagram of an efficient biosolids processing facility 401 employing deoxidation to convert biosolids into a combustible material in close proximity to and combined with a thermal power station 402. The unit 401 is typified by FIG. 1, charging biosolids from a WWTP. However, since the supply of biosolids available to a station of economic size is unlikely to be sufficient for its fuel needs, it also represents a family of liquid deoxidation processes charging a spectrum of renewable biomass and/or hydrophilic low-rank fossil fuel. With any or all of these potential fuels, liquid deoxidation makes them less hydrophilic and more uniform and thermally efficient for combustion in the power station 402. The station 402 represents a spectrum of conventional and unconventional combustion systems culminating, via steam turbine or gas turbine combined cycles, in the production of electricity for the local market and/or the national grid.

Biosolids are charged to the unit 401 via a line 403. Alternatively or additionally, biomass waste, as paper mill sludge or from agriculture or forestry, is delivered by a transport means 404, and (optionally) hydrophilic low-rank fossil fuel is delivered through a transport means 405. Water as required to form a pumpable charge slurry is added through a line 406. After being processed according to FIG. 1, the now excess water is returned to a WWTP, or treated for discharge by known means, via a line 407. Uniform (dewatered) high energy density char slurry, or dried and pelletized char, is delivered through a transport means 408 to the station 402.

The char or char slurry transported by the transport means 408 is combusted by one of the known methods to yield thermal energy for the generation of steam, which is expanded through conventional steam turbines driving electric generators, or it may be partially oxidized (with either air or commercial oxygen) to yield a fuel gas subsequently burned in a gas turbine combustor driving an electricity generator, the hot exhaust gas from which generates steam for an integrated steam turbine-driven generator. The partial combustion of char may be accomplished according to known processes separating the ash as a fluid slag, or in accordance with U.S. Pat. No. 5,485,728, the entire disclosure of which is incorporated by reference herein, which teaches separation of the ash particles in an aqueous slurry.

Since the amount of char available may have insufficient fuel energy to generate the amount of electricity for which there is a market, supplemental fossil fuel can be supplied via a transport means 410. Air for the combustion or partial combustion of the biomass and/or fossil fuel char is supplied through a line 411. After subjecting it to appropriate known pollution control measures, flue gas (or gases) from the combustion at the station 402 is (are) discharged through a stack 412.

Treated boiler feed water makeup is supplied through a line 413, and blowdown required to maintain boiler water within specifications is discharged via a line 414 to the unit 401, where it may comprise some of the water needed to form a sufficiently fluid feed slurry to the deoxidation operation. Ash, the non-combustible residue from burning the char and auxiliary fuels, or ash slurry, is withdrawn for disposal via a conduit 415.

One of the known methods of controlling the emission of nitrogen oxides from atmospheric pressure boilers is overfiring with a reactive fuel above the main flame zone. Because of its volatiles content and high reactivity, biosolids char is a suitable fuel for this purpose, and a portion of that from the conveying means 408 can be diverted by way of a transport means 416 for nitrogen oxide reduction. The product of the combination, electricity, is delivered from the site via electric cables 417.

For simplification, the biosolids treatment unit 401 is shown as though it had the capacity and raw material supply to furnish the power station 402 with sufficient char fuel. In a practical installation, a treatment unit 401 may be located adjacent to the power station 402, and one or more such units 401 may be installed at other location(s) close to the raw material sources. This gives the operator the flexibility to employ tailored deoxidation temperatures, optimized for the particular feedstock. In such an event, dry char can then be shipped to the power station 402 by road or rail or, if economics dictate, it can be supplied as an aqueous slurry via a pipeline. The flow of money, in the form of a tipping fee, from the WWTP to the deoxidation unit, is indicated by a dashed line 418

Figure 5:
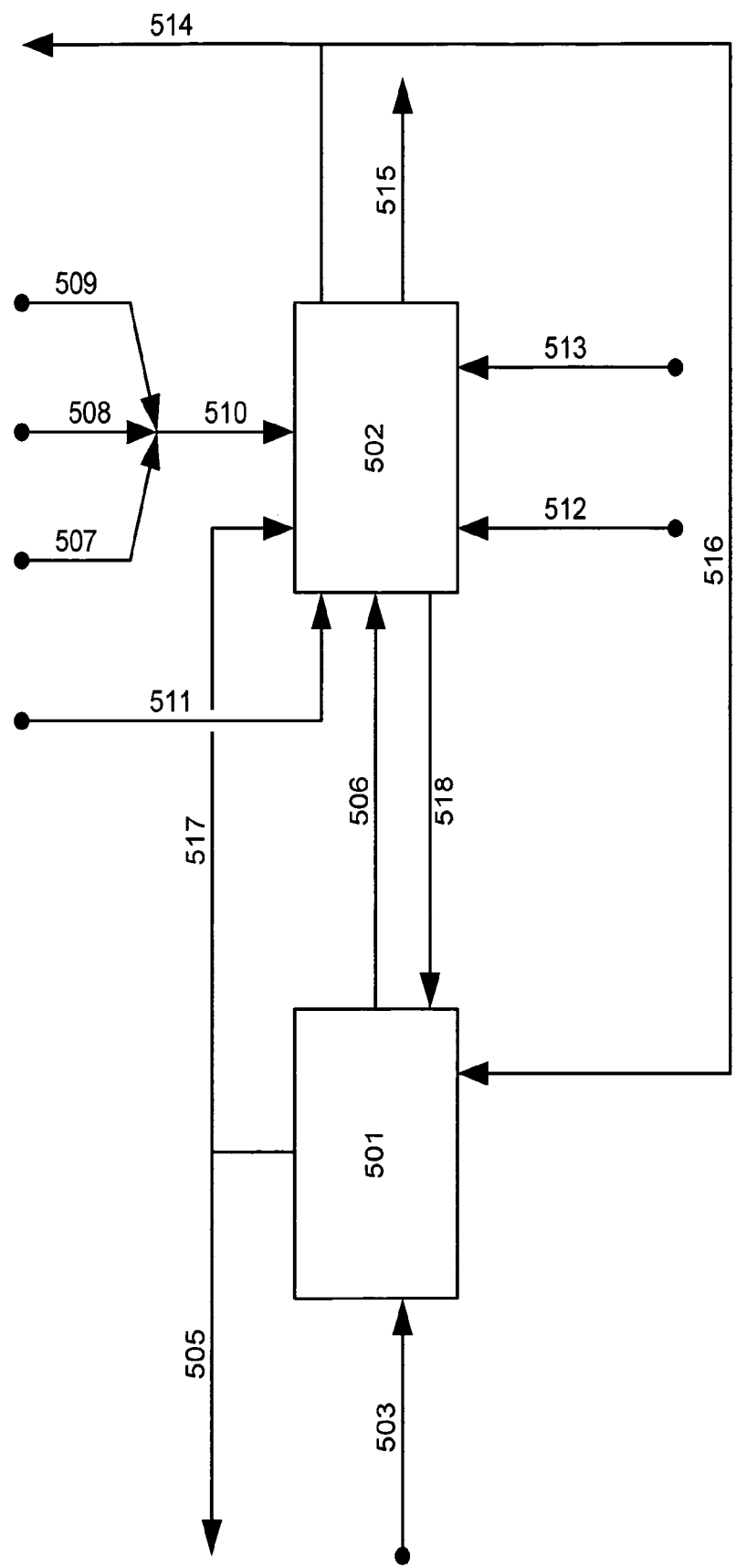
FIG. 5 is a flow diagram in which the process of the present invention is combined with a thermal dryer and used in a cement kiln.

FIG. 5 is a simplified flow diagram of a combination comprising a thermal dryer unit 501 and a cement kiln 502. The thermal dryer unit 501 is installed as close as feasible to one or more cement kilns 502, employing principally the same configuration as shown in and described in conjunction with FIG. 3, but without deoxidizing the biosolids. Biosolids are supplied via a transport means 503. By applying heat to the raw biosolids cells, water contained in the cells is evaporated and leaves via a line 505 for scrubbing and condensing or, alternatively, is conducted via a line 517 back to the kiln to be utilized in the kiln as make-up water or for NOx reduction.

The resulting dried biosolids are conducted to the kiln via a line 506 where the Btu value as well as the value of the ash are utilized. The primary ingredients, such as are shown in FIG. 3, are added to the kiln at the lines 507, 508, 509 through a conduit 510. As in FIG. 3, in a preheat section, waste combustibles are added, such as used tires and broken asphalt charged through a conduit 511. As in FIG. 3, combustion air and primary fuel arrive via conduits 513 and 512, respectively. Cement klinker exits the kiln via a conduit 515.

Although thermal drying has an inherent energy penalty from the latent heat in the evaporation of water, this penalty can be entirely or partially overcome by integrating with the cement kiln and utilizing heat from the kiln via a conduit 518. More specifically, flue gas, normally traveling via a conduit 514 to an appropriate discharge, can be directed via a conduit 516 to the thermal dryer, thereby reducing the need for primary fuels at thermal dryer 501 for evaporating the water liberated from the biosolids.

As discussed briefly above, because the potential supply of biosolids char is smaller, by orders of magnitude, than the general fuels market, other substances, for example biomass, can be co-processed in a liquid deoxidation unit, or processed in parallel equipment, and the resulting chars blended before being used as a fuel, for example in accordance with the teachings of U.S. Pat. No. 5,485,728. Several locations, such as Hawaii (biosolids, pineapple and sugar cane wastes) and Sacramento, Calif. (biosolids and rice hulls and stalks), offer sites for slurry co- or parallel deoxidation. Paper mill and paper recycling sludges, although they may require alkali addition to neutralize chlorine, are other promising sources of supplemental hydrophilic biomass. These methods afford a means of consolidating diverse sources into a uniform liquid or solid char slurry fuel.

EXAMPLES

The following examples are only representative of the methods and systems for use in practicing the present invention, and are not to be construed as limiting the scope of the invention in any way.

Example 1

Biosolids from two wastewater treatment plants, one in Atlanta, Ga., and one in Riverside, Calif., were subjected to the earlier described treatment in a continuous pilot plant, resulting in the following feed and product analyses, reported on a moisture and ash-free basis:

|  | Atlanta Raw Biosolids | Riverside Raw Biosolids |
| --- | --- | --- |
| Carbon | 57.73 | 62.53 |
| Hydrogen | 7.48 | 9.26 |
| Nitrogen | 7.90 | 7.52 |
| Sulfur | 3.02 | 1.17 |
| Oxygen | 23.86 | 19.52 |
| Total | 100.00 | 100.00 |

|  | Atlanta Char Product | Riverside Char Product |
| --- | --- | --- |
| Carbon | 70.19 | 69.98 |
| Hydrogen | 8.85 | 7.68 |
| Nitrogen | 8.63 | 8.45 |
| Sulfur | 1.42 | 8.86 |
| Oxygen | 10.91 | 5.04 |
| Total | 100.00 | 100.00 |

As would be expected, the splitting off of carbon dioxide has resulted in an increase in carbon content and a corresponding decrease in oxygen content.

The off-gas composition of the two runs was as follows:

|  | Atlanta Off Gas | Riverside Off Gas |
| --- | --- | --- |
| Carbon Dioxide | 89.7% | 92.8% |
| Volatile Organics | 10.0% | 6.0% |
| Sulfur Compounds | 0.3% | 1.2% |
| Total | 100.0% | 100.0% |

Theoretical Example 1

A cement kiln in the southwestern U.S. has a production capacity of 3,200 tons/day. To reach temperatures required to form cement "clinker", it fires low-grade coal, supplemented to some extent by charging scrap rubber tires. Sensible heat in the flue gas, after preheating mineral charge and combustion air, may be taken advantage of to dry and incinerate 20 tons/day (dry basis) of biosolids from area wastewater treatment plants. Although every ton of dry biosolids constituents is accompanied by about four tons of water (giving the biosolids a negative heating value), revenue from the tipping fee offsets the cost of extra coal that must be fired. However, the amount is limited by the thermal capacity to evaporate the water and by the increased volume of flue gas, increasing pressure drop and fan horsepower.

Using this invention, the kiln may use biosolids dewatered and deoxidized in accordance with the present invention at one or more of the nearby WWTPs. As such, about 80% to 94% of the water formerly charged with the raw biosolids bypasses the kiln, permitting it to charge seven times as much deoxidized material without exceeding thermal capacity and fan horsepower limits. The biosolids disposed of by the kiln can be increased by a factor of about 700%, with a corresponding increase in tipping fees.

Other than in the operating examples, or unless otherwise expressly specified, all of the numerical ranges, amounts, values and percentages such as those for amounts of materials, times and temperatures of reaction, ratios of amounts, and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety.

What is claimed is:

1. A process of converting biosolids into a fuel comprising the steps of:
    providing biosolids comprising cells and cell-bound water;
    applying sufficient pressure to the biosolids at an inlet of a continuous flow system to maintain liquidity of the biosolids;
    heating the pressurized biosolids in the continuous flow system to a first temperature sufficient to rupture cells and thereby free the cell-bound water to form a slurry of ruptured biosolids cells, and then to a second temperature sufficient to carbonize the slurry of ruptured biosolids cells to form a char slurry;
    depressurizing the char slurry at an outlet of the continuous flow system;
    removing at least a portion of the freed cell-bound water from the char slurry to provide an at least partially dewatered ruptured biosolids product; and
    producing a dried product by thermally drying the at least partially dewatered ruptured biosolids product to remove a further portion of the freed cell-bound water.

2. A process according to claim 1, wherein the step of heating the pressurized biosolids to the second temperature evolve carbon dioxide from the biosolids.

3. A process according to claim 2, including separating the carbon dioxide from the char slurry.

4. A process according to claim 3, wherein removing at least a portion of the freed cell-bound water provides an at least partially dewatered char product, and including reacting the char product with a gas comprising oxygen to convert its fuel value into thermal energy, and further comprising at least one of the steps of using the thermal energy and incinerating the fuel.

5. A process according to claim 4, further comprising using the thermal energy for process heat.

6. A process according to claim 5, further comprising the step of using the process heat to dry the dewatered char product.

7. A process according to claim 2, wherein sulfur contained in the carbon dioxide gas is generated in the separating step, and including removing the sulfur with pollution control equipment.

8. A process according to claim 4, wherein ash produced is utilized in at least one of a cement kiln, building materials, compost, or fertilizer product.

9. The process of claim 4, wherein the char product is further processed to extract at least one of iron and phosphorous.

10. A process according to claim 3, wherein booster pumps are provided downstream to reduce the required head pressure of the pump.

11. A process according to claim 3, wherein free water from the removing step is recirculated to the providing step in order to reduce the required head pressure of the pump.

12. A process according to claim 3, wherein the step of removing comprises removing water-soluble constituents from the char slurry.

13. A process according to claim 3, wherein the char slurry comprises charred ruptured biosolids cells, and comprising converting the char slurry to a carbon-based product.

14. A process according to claim 3, wherein the at least partially dewatered ruptured biosolids product is a char product.

15. A process according to claim 14, further comprising transporting the char product to a chemical plant and converting the char product to at least one of a synthesis gas, oil, oxygenated compounds, carbon fibers, fertilizer additive, and combinations thereof.

16. A process according to claim 14, further comprising pretreating water removed from the char slurry.

17. A process according to claim 16, wherein pretreating the water removed from the char slurry renders a methane gas.

18. The process of claim 17, wherein natural gas is utilized as fuel for at least one of the heating step and the removing step.

19. A process according to claim 16, including recycling at least a portion of pretreated water to the providing step.

20. A process according to claim 16, wherein pretreating the water comprises pretreating with at least one of membranes, vibrating membranes, ammonia removal, anaerobic digestion, and reverse osmosis.

21. A process according to claim 20, further comprising adding a chelating agent to the water removed from the charred slurry.

22. A process according to claim 16, further comprising the step of adding a chelating agent to the char product.

23. The process of claim 16, wherein pretreating occurs in a digester.

24. A process according to claim 14, further comprising recovering iron from the dewatered char product.

25. A process according to claim 14, further comprising the step of cooling dried char fuel immediately after drying.

26. A process according to claim 3, wherein, when foam interferes with the step of separating, char slurry from a lower part of a separator is pumped and sprayed toward the foam from at least one spray nozzle located above a liquid level in the separator.

27. A process according to claim 3, further comprising discharging the carbon dioxide through at least one of a flame of a process heater, a purification device, and a pollution control device.

28. A process according to claim 3, wherein the step of separating the carbon dioxide further comprises at least one of the steps of:
    sequestering carbon dioxide into at least one of earth and a large body of water;
    purifying and using carbon dioxide for at least one of carbonizing beverages, pressurizing fire extinguishers, spray can propellant, refrigerant, and inert blanketing gas;
    using the carbon dioxide as a mixable flooding agent for tertiary oil recovery; and
    combinations thereof.

29. A process according to claim 3, wherein heating comprises using steam as a heating medium.

30. The process according to claim 3, wherein the producing step includes removing the further portion of free water as steam.

31. A process according to claim 1, wherein the step of applying sufficient pressure comprises providing at least one pump.

32. A process according to claim 1, wherein the producing step comprises removing the further portion of water as steam.

33. A process according to claim 1, wherein the dried product is a dried char product, and comprising mixing the dried char product with a fuel oil to form a coal-oil mixture.

34. A process according to claim 1, wherein the slurry is a char slurry of charred ruptured biosolids cells, and comprising mixing the char slurry with a fuel oil to form a coal-oil mixture.

35. A process according to claim 1, wherein the dried product is a char product, and comprising converting the dried char product to a carbon-based product.

36. A process according to claim 1, wherein the removing step further comprises recycling at least a portion of a removed aqueous phase to the providing step.

37. A process according to claim 1, further comprising adding at least one of water, heat, steam, and a combination thereof to the biosolids prior to the step of applying.

38. A process according to claim 1, comprising at least one of grinding, shearing, and screening the biosolids prior to the step of applying.

39. A process according to claim 1, further comprising at least one of cooling the slurry before depressurization and cooling the slurry after depressurization.

40. A process according to claim 39, wherein the step of cooling occurs prior to the depressurizing step.

41. A process according to claim 1, wherein the depressurizing step occurs in at least two increments.

42. A process according to claim 1, wherein the step of heating further comprises providing a hot heat transfer fluid and heating the pressurized biosolids with the hot heat transfer fluid.

43. A process according to claim 42, wherein the step of heating the pressurized biosolids with the heat transfer fluid comprises further heating the pressurized biosolids by condensing vapor of vaporized heat transfer fluid.

44. A process according to claim 1, further comprising exchanging heat in the slurry with the pressurized biosolids.

45. A process according to claim 44, wherein the step of exchanging occurs prior to the step of applying.

46. The process of claim 1, wherein the step of heating the biosolids comprises using process heat from a cement kiln until the cell-bound water evaporates to form dry biosolids.

47. The method of claim 46, wherein said method further comprises the steps of:
combusting the dry biosolids in the cement kiln to form combusted biosolids comprising at least a portion of ash; and
using the portion of ash to reduce the quantities of limestone, clay or shale added to the cement.

48. The process of claim 1, wherein gas from a digester is utilized as fuel for at least one of the heating step and the removing step.

49. The process of claim 1, wherein said steam is used for process heat.

50. The process of claim 1, further comprising the step of digesting the char slurry after depressurizing.

51. The process of claim 1, further comprising the step of recycling at least a portion of the slurry of ruptured biosolids back to the pressurized biosolids.

52. The process of claim 1, wherein the heating step is performed sequentially using a first heat exchange device and a second heat exchange device.

53. The process of claim 1, wherein the at least partially dewatered ruptured biosolids product contains about 35% to 65% solids.

54. The process of claim 1, wherein the at least partially dewatered ruptured biosolids product contains about 50% to 60% solids.

55. The process of claim 1, wherein the producing step comprises separating the further portion of the freed cell-bound water from the dried product.

56. The process of claim 55, further comprising the step of supplying the dried product as a fuel for combustion.

57. A process of converting biosolids into a renewable fuel comprising the steps of:
delivering biosolids to a raw feed tank;
performing at least one of heating, grinding, and shearing to the biosolids in the raw feed tank to form a slurry;
pressurizing the slurry;
heating the slurry;
reacting the slurry to form char, wherein the char has a substantial increase in solids carbon content and a substantial decrease in solids oxygen content;
cooling the char slurry;
after cooling the char slurry, depressurizing the cooled char slurry;
liberating carbon dioxide from the char;
dewatering the char to form a dewatered char product; and
drying or pelletizing the dewatered char product.

58. The process of claim 57, wherein the dewatered char product has about 15% to 20% of the weight of comparable raw biosolids.

59. The process of claim 57, wherein dewatering comprises separating a first portion of water from the dewatered char product and drying comprises separating a second portion of water from the dewatered char product.

60. The process of claim 59, further comprising the step of supplying the dewatered char product as a fuel for combustion after dewatering and drying.

61. A process of converting biosolids into a fuel comprising the steps of:
providing biosolids comprising cells and cell-bound water at ambient temperature;
applying sufficient pressure to the biosolids at an inlet of a closed flow system to maintain liquidity of the biosolids;
heating the pressurized biosolids in the closed flow system from ambient temperature to a first elevated temperature sufficient to rupture cells and thereby free the cell-bound water to form a slurry of ruptured biosolids cells, said heating step performed without venting gases from the closed flow system;
recycling a portion of the slurry of ruptured biosolids cells into the biosolids after said providing step;
depressurizing the slurry of ruptured biosolids cells at an outlet of the closed flow system; and
after said recycling step, removing at least a portion of the freed cell-bound water from the slurry to provide an at least partially dewatered ruptured biosolids product.

62. The process of claim 61, wherein the heating step comprises heating the pressurized biosolids from ambient temperature by indirect heat exchange.

63. The process of claim 61, wherein the heating step further includes a second temperature sufficient to evolve carbon dioxide from the biosolids and form a char slurry comprising charred, ruptured biosolids cells.

64. The process of claim 63, further comprising the step of separating the carbon dioxide from the char slurry during the depressurizing step.

65. The process of claim 63, wherein the heating step is performed sequentially using a first heat exchange device and a second heat exchange device.

66. The process of claim 61, further comprising the step of cooling the slurry of ruptured biosolids cells before the depressurizing step to maintain liquidity of the freed cell-bound water during the depressurizing step.

67. The process of claim 61, wherein the recycled portion is added to the biosolids before said applying step.

68. The process of claim 61, wherein the recycled portion is added to the biosolids after said applying step.

69. The process of claim 61, wherein said recycling step occurs before said depressurizing step, whereby the recycled portion is still under pressure when added to the biosolids at ambient temperature.

70. The process of claim 61, further comprising the step of cooling the slurry of ruptured biosolids cells after the recycling step.

71. A process of converting biosolids into a fuel comprising the steps of:
   providing biosolids comprising cells and cell-bound water;
   applying sufficient pressure to the biosolids at an inlet of a closed flow system to maintain liquidity of the biosolids;
   heating the pressurized biosolids in the closed flow system to a first temperature sufficient to rupture cells and thereby free the cell-bound water to form a slurry of ruptured biosolids cells;
   depressurizing the slurry of ruptured biosolids cells at an outlet of the closed flow system to a lowered pressure;
   before the depressurizing step, cooling the slurry of ruptured biosolids cells in the closed flow system to a lowered temperature below the boiling point of water at the lowered pressure; and
   removing at least a portion of the freed cell-bound water from the slurry to provide an at least partially dewatered ruptured biosolids product.

72. The process of claim 71, wherein the heating step comprises heating the pressurized biosolids by indirect heat exchange.

73. The process of claim 71, wherein the heating step further includes a second temperature sufficient to evolve carbon dioxide from the biosolids and form a char slurry comprising charred, ruptured biosolids cells.

74. The process of claim 73, further comprising the step of separating the carbon dioxide from the char slurry during the depressurizing step.

75. The process of claim 71, wherein the biosolids enter the closed flow system at ambient temperature, the applying step including applying pressure to the biosolids at ambient temperature and the heating step including heating the pressurized biosolids from ambient temperature.

76. The process of claim 71, wherein the cooling step includes cooling the slurry of ruptured biosolids cells before the depressurizing step to maintain liquidity of the freed cell-bound water during the depressurizing step.

77. The process of claim 71, wherein the lowered temperature is about 40 degrees C. to 90 degrees C.

78. The process of claim 71, wherein the lowered temperature is near ambient.

79. The process of claim 71, further comprising processing the slurry of ruptured biosolids cells to extract at least one of iron and phosphorous.

80. A process of converting biosolids into a fuel comprising the steps of:
   providing biosolids comprising cells and cell-bound water;
   applying sufficient pressure to the biosolids to maintain liquidity;
   heating the pressurized biosolids to a first temperature sufficient to rupture cells and thereby free the cell-bound water to form a slurry of ruptured biosolids cells;
   cooling the slurry of ruptured biosolids cells;
   depressurizing the slurry of ruptured biosolids cells to near atmospheric pressure while maintaining liquidity of the freed cell-bound water; and
   removing at least a portion of the freed cell-bound water from the slurry to provide an at least partially dewatered ruptured biosolids product.

81. The process of claim 80, wherein the heating step further includes a second temperature sufficient to evolve carbon dioxide from the biosolids and form a char slurry comprising charred, ruptured biosolids cells.

82. The process of claim 81, further comprising the step of separating the carbon dioxide from the char slurry during the depressurizing step.

83. The process of claim 82, wherein the removing step includes removing a first portion of the freed cell-bound water from the slurry as a liquid and a second portion of the freed cell-bound water from the slurry as a vapor.

84. The process of claim 80, wherein the applying step includes applying pressure to the biosolids at ambient temperature and the heating step includes heating the pressurized biosolids from ambient temperature.

85. The process of claim 80, further comprising the step of cooling the slurry of ruptured biosolids cells before the depressurizing step to maintain liquidity of the freed cell-bound water during the depressurizing step.

86. A process of converting biosolids into a fuel comprising the steps of:
   providing biosolids comprising cells and cell-bound water at ambient temperature;
   applying sufficient pressure to the biosolids at ambient temperature to maintain liquidity;
   after said applying step, heating the pressurized biosolids from ambient temperature to a first elevated temperature sufficient to rupture cells and thereby free the cell-bound water to form a slurry of ruptured biosolids cells
   exchanging heat between the slurry of ruptured biosolids cells and the pressurized biosolids to initially cool the slurry of ruptured biosolids cells while concurrently heating the pressurized biosolids from ambient temperature in said heating step;
   depressurizing the slurry of ruptured biosolids cells; and
   removing at least a portion of the freed cell-bound water from the slurry to provide an at least partially dewatered ruptured biosolids product.

87. The process of claim 86, wherein the heating step further includes a second temperature sufficient to evolve carbon dioxide from the biosolids and form a char slurry comprising charred, ruptured biosolids cells.

88. The process of claim 87, further comprising the step of separating the carbon dioxide from the char slurry during the depressurizing step.

89. The process of claim 86, wherein the heating step ceases and the depressurizing step begins before the biosolids reach a second temperature sufficient to evolve carbon dioxide from the biosolids.

90. The process of claim 89, wherein the heating step comprises heating the pressurized biosolids from ambient temperature by direct exchange with steam.

91. The process of claim 86, further comprising the step of recycling at least a portion of the slurry of ruptured biosolids back to the pressurized biosolids.

92. The process of claim 86, wherein the providing step includes receiving biosolids from a wastewater treatment plant having a solids content of approximately 20%.

93. The process of claim 86, wherein the exchanging step comprises recycling the slurry of ruptured biosolids cells into the pressurized biosolids.

94. The process of claim 86, wherein the exchanging step comprises indirectly exchanging heat between the slurry of ruptured biosolids cells and the pressurized biosolids.

95. The process of claim 86, wherein the heating step comprises heating the pressurized biosolids to a second temperature sufficient to carbonize the slurry of ruptured biosolids cells to form a char slurry, and the exchanging step comprises cooling the char slurry from the second temperature while concurrently heating the pressurized biosolids from ambient temperature in the heating step.

96. A process of converting biosolids into a fuel comprising the steps of:
- providing biosolids comprising cells and cell-bound water at ambient temperature;
- applying sufficient pressure to the biosolids at ambient temperature to maintain liquidity;
- after said applying step, heating the pressurized biosolids by direct exchange with steam from ambient temperature to a first elevated temperature sufficient to rupture cells and thereby free the cell-bound water to form a slurry of ruptured biosolids cells;
- depressurizing the slurry of ruptured biosolids cells; and
- removing at least a portion of the freed cell-bound water from the slurry to provide an at least partially dewatered ruptured biosolids product.

97. The process of claim 96, wherein the heating step further includes a second temperature sufficient to evolve carbon dioxide from the biosolids and form a char slurry comprising charred, ruptured biosolids cells.

98. The process of claim 97, further comprising the step of separating the carbon dioxide from the char slurry during the depressurizing step.

99. The process of claim 96, wherein the heating step ceases and the depressurizing step begins before the biosolids reach a second temperature sufficient to evolve carbon dioxide from the biosolids.

100. A process of converting biosolids into a fuel comprising the steps of:
- providing biosolids comprising cells and cell-bound water;
- applying sufficient pressure to the biosolids to maintain liquidity;
- heating the pressurized biosolids to a first elevated temperature sufficient to rupture cells and thereby free the cell-bound water to form a slurry of ruptured biosolids cells;
- recycling a portion of the slurry of ruptured biosolids cells into the biosolids after said providing step;
- depressurizing the slurry of ruptured biosolids cells; and
- after said recycling step, removing at least a portion of the freed cell-bound water from the slurry to provide an at least partially dewatered ruptured biosolids product.

101. The process of claim 100, wherein the recycled portion is added to the biosolids before said applying step.

102. The process of claim 100, wherein the recycled portion is added to the biosolids after said applying step.

103. The process of claim 100, wherein said recycling step occurs before said depressurizing step, whereby the recycled portion is still under pressure when added to the biosolids at ambient temperature.

104. The process of claim 100, further comprising the step of cooling the slurry of ruptured biosolids cells after the recycling step.

* * * * *